US012737361B2

(12) United States Patent
Shama et al.

(10) Patent No.: US 12,737,361 B2
(45) Date of Patent: Sep. 15, 2026

(54) MACHINE LEARNING-BASED PROCESSING OF QUERIES USING STRUCTURED DATA CONVERTED TO NATURAL LANGUAGE DOCUMENTS

(71) Applicant: Dell Products L.P., Round Rock, TX (US)

(72) Inventors: Thirumaleshwara Adyanadka Shama, Austin, TX (US); Shibi Panikkar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/934,521

(22) Filed: Nov. 1, 2024

(65) Prior Publication Data

US 2026/0127175 A1 May 7, 2026

(51) Int. Cl.

*G06F 16/2455* (2019.01)
*G06F 16/22* (2019.01)
*G06F 16/28* (2019.01)

(52) U.S. Cl.

CPC ...... *G06F 16/2455* (2019.01); *G06F 16/2237* (2019.01); *G06F 16/282* (2019.01)

(58) Field of Classification Search

CPC . G06F 16/2455; G06F 16/2237; G06F 16/282
See application file for complete search history.

(56) References Cited

U.S. PATENT DOCUMENTS 11,625,387 B2 * 4/2023 Siepmann ........... G06F 16/2455 707/690
2020/0026804 A1 * 1/2020 Garg ..................... G06F 16/332
2022/0374397 A1 * 11/2022 Wong .................. G06F 16/2456

OTHER PUBLICATIONS

S. S. Conn, "OLTP and OLAP Data Integration: A Review of Feasible Implementation Methods and Architectures for Real Time Data Analysis," Proceedings of the IEEE Southeast Conference, Apr. 2005, 6 pages.

(Continued)

*Primary Examiner* — Hares Jami
(74) *Attorney, Agent, or Firm* — Ryan, Mason & Lewis, LLP

(57) ABSTRACT

An apparatus comprises at least one processing device configured to obtain, at an application interface, a query directed to structured data, to convert the structured data into natural language documents, to associate the natural language documents with context and differentiating entities in a hierarchical database defining a hierarchy of the differentiating and context entities, and to determine a tenant boundary of the query specifying at least one of the context entities associated with at least one of the differentiating entities in the hierarchical database. The at least one processing device is further configured to generate a prompt identifying the query and a subset of the natural language documents selected based at least in part on the determined tenant boundary, to process the prompt utilizing at least one machine learning model to generate an answer for the query, and to provide, via the application interface, the generated answer to the query.

20 Claims, 19 Drawing Sheets

(56) References Cited

OTHER PUBLICATIONS

V. Yadav et al., "Paraphrase and Aggregate with Large Language Models for Minimizing Intent Classification Errors," arXiv:2406. 17163v1, Jun. 24, 2024, 8 pages.
Dell Technologies, "APEX," Solution Brief, Sep. 2023, 2 pages.
I. A. Machado et al., "Data Mesh: Concepts and Principles of a Paradigm Shift in Data Architectures," Procedia Computer Science, vol. 196, Oct. 2021, pp. 263-271.
Dell Technologies, "APEX Unified Multicloud Experience," Jun. 2024, 10 pages.

* cited by examiner

300

| SON | EDD | ORD DATE | AMT | PROD DESC | LOB | VPID | CUST NAME | CUST ID |
|---|---|---|---|---|---|---|---|---|
| 12345 | 20/10/2023 00:00:00 | 18/10/2023 10:37:30 | 456.78 | MONITOR - 68.6CM (27") | DISPLAYS | 20021001 | XYZ CORP. | 23456 |

SON: SALES ORDER NUMBER
EDD: ESTIMATED DELIVERY DATE
ORD DATE: ORDER DATE
AMT: AMOUNT
PROD DESC: PRODUCT DESCRIPTION
LOB: LINE OF BUSINESS
VPID: VENDOR PRODUCT IDENTIFIER
CUST NAME: CUSTOMER NAME
CUST ID: CUSTOMER IDENTIFIER

| COLUMN NAME | PREFIX | SUFFIX | IS DIFFERENTIATING ENTITY? | LINKER ORDER |
|---|---|---|---|---|
| Cust_Name | Customer | | No | 1 |
| Cust_ID | , with | | Yes | 2 |
| Product_Description | ordered | | No | 3 |
| Ord_Date | On | | No | 4 |
| Order_Time | At | Full_Stop | No | 5 |
| Amt | Amount is | Full_Stop | No | 6 |
| Ord_Num | Order Number is | Full_Stop | No | 7 |
| VPID | Vendor Purchase Number is | Full_Stop | No | 8 |
| LOB | Line of Business is | Full_Stop | No | 9 |
| EDD | Expected Delivery Date of Order is | Full_Stop | No | 10 |

Figure 10:
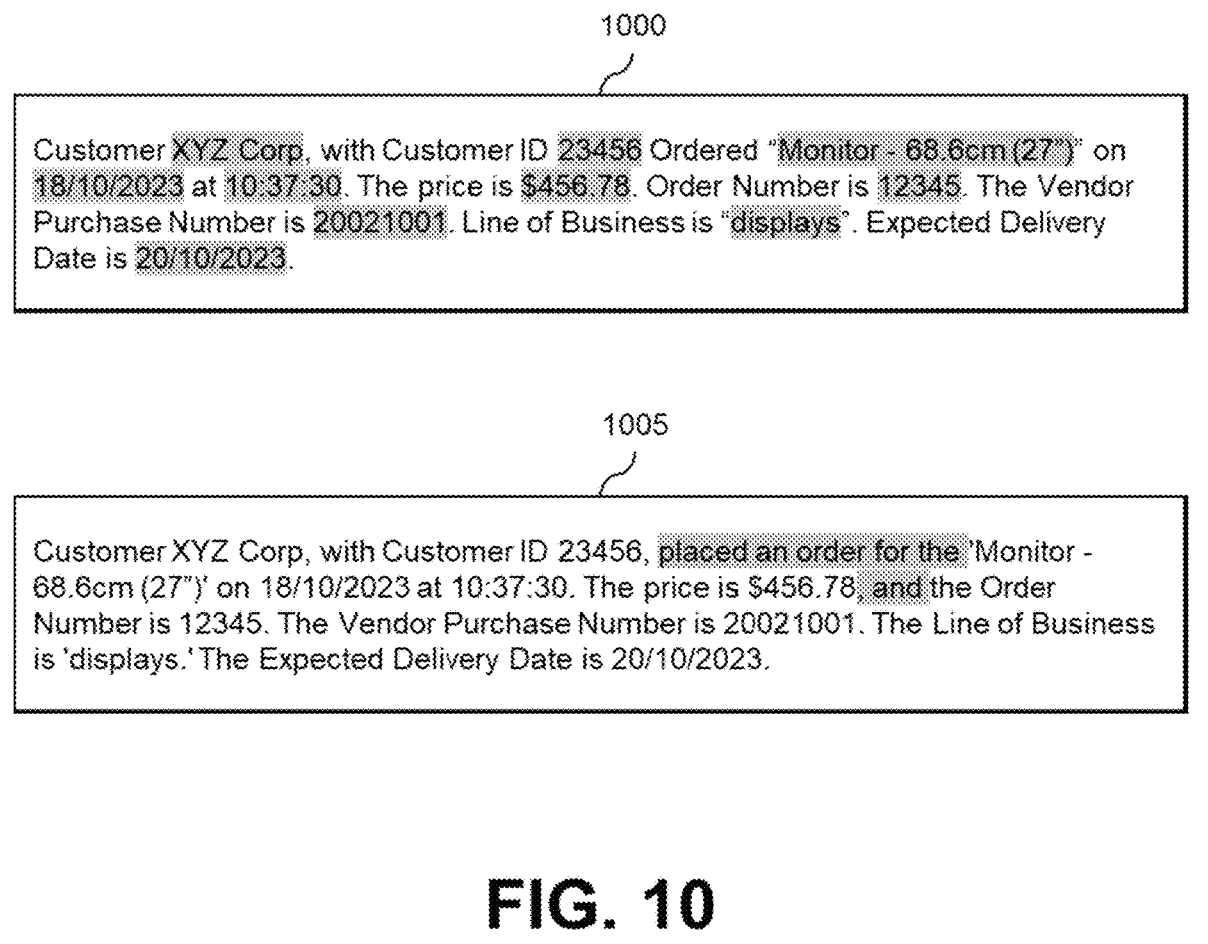

Customer XYZ Corp, with Customer ID 23456 Ordered "Monitor - 68.6cm (27")" on 18/10/2023 at 10:37:30. The price is $456.78. Order Number is 12345. The Vendor Purchase Number is 20021001. Line of Business is "displays". Expected Delivery Date is 20/10/2023.

1005

Customer XYZ Corp, with Customer ID 23456, placed an order for the 'Monitor - 68.6cm (27")' on 18/10/2023 at 10:37:30. The price is $456.78, and the Order Number is 12345. The Vendor Purchase Number is 20021001. The Line of Business is 'displays.' The Expected Delivery Date is 20/10/2023.

| SON | EDD | ORD DATE | AMT | PROD DESC | LOB | VPID | CUST NAME | CUST ID |
|---|---|---|---|---|---|---|---|---|
| 12345 | 20/10/2023 00:00:00 | 18/10/2023 10:37:30 | 456.78 | MONITOR - 68.6CM (27") | DISPLAYS | 20021001 | XYZ CORP. | 23456 |
| 12356 | 23/10/2023 00:00:00 | 18/10/2023 10:37:30 | 155.61 | DUAL MONITOR STAND | DISPLAY ACCESSORIES | 20021001 | XYZ CORP. | 23456 |
| 12367 | 02/11/2023 00:00:00 | 18/10/2023 10:37:30 | 856.12 | DESKTOP COMPUTER | DESKTOPS | 20021003 | XYZ CORP. | 23456 |
| 12389 | 31/10/2023 00:00:00 | 11/10/2023 15:57:36 | 22145.60 | MOBILE WORKSTATION | MOBILE WORKSTATIONS | 20081450 | XYZ CORP. | 23456 |
| 12401 | 31/10/2023 00:00:00 | 11/10/2023 15:57:36 | 10334.14 | MOBILE WORKSTATION | MOBILE WORKSTATIONS | 20081450 | XYZ CORP. | 23456 |

SON: SALES ORDER NUMBER
EDD: ESTIMATED DELIVERY DATE
ORD DATE: ORDER DATE
AMT: AMOUNT
PROD DESC: PRODUCT DESCRIPTION
LOB: LINE OF BUSINESS
VPID: VENDOR PRODUCT IDENTIFIER
CUST NAME: CUSTOMER NAME
CUST ID: CUSTOMER IDENTIFIER

Figure 12:
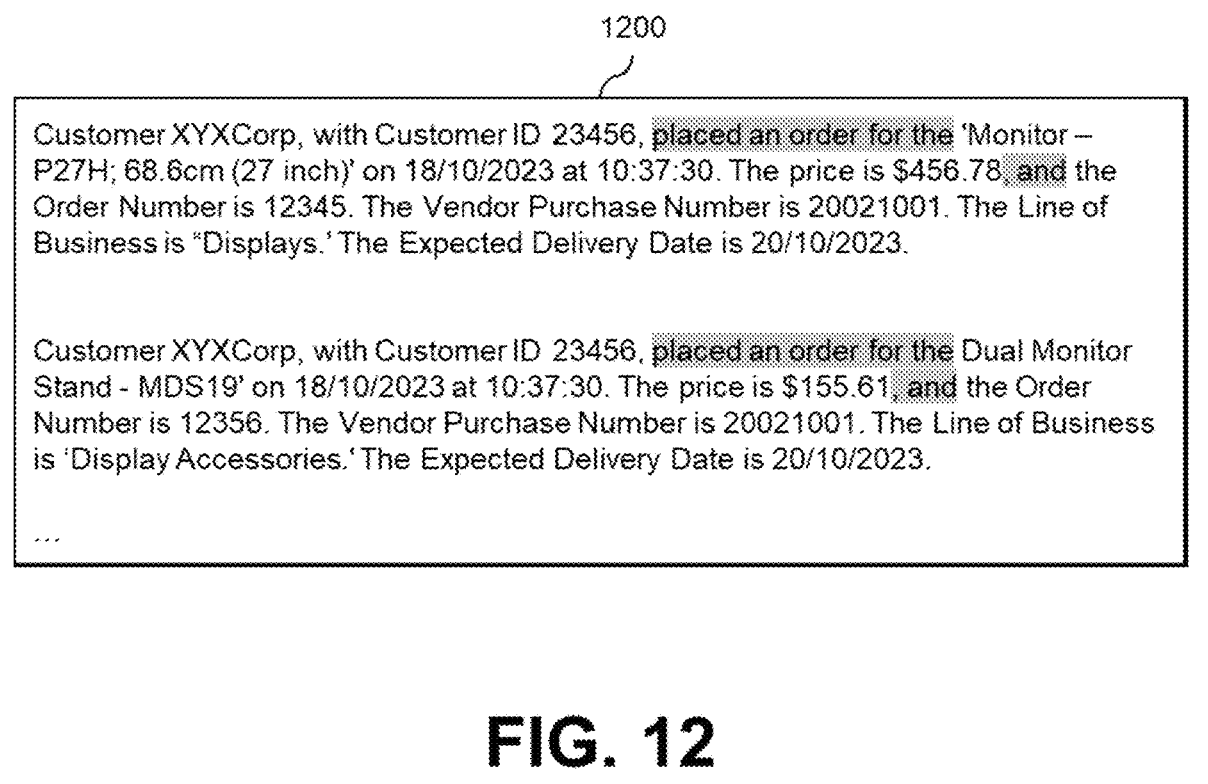

Customer XYXCorp, with Customer ID 23456, placed an order for the 'Monitor – P27H; 68.6cm (27 inch)' on 18/10/2023 at 10:37:30. The price is $456.78, and the Order Number is 12345. The Vendor Purchase Number is 20021001. The Line of Business is "Displays.' The Expected Delivery Date is 20/10/2023.

Customer XYXCorp, with Customer ID 23456, placed an order for the Dual Monitor Stand - MDS19' on 18/10/2023 at 10:37:30. The price is $155.61, and the Order Number is 12356. The Vendor Purchase Number is 20021001. The Line of Business is 'Display Accessories.' The Expected Delivery Date is 20/10/2023.

Figure 13:
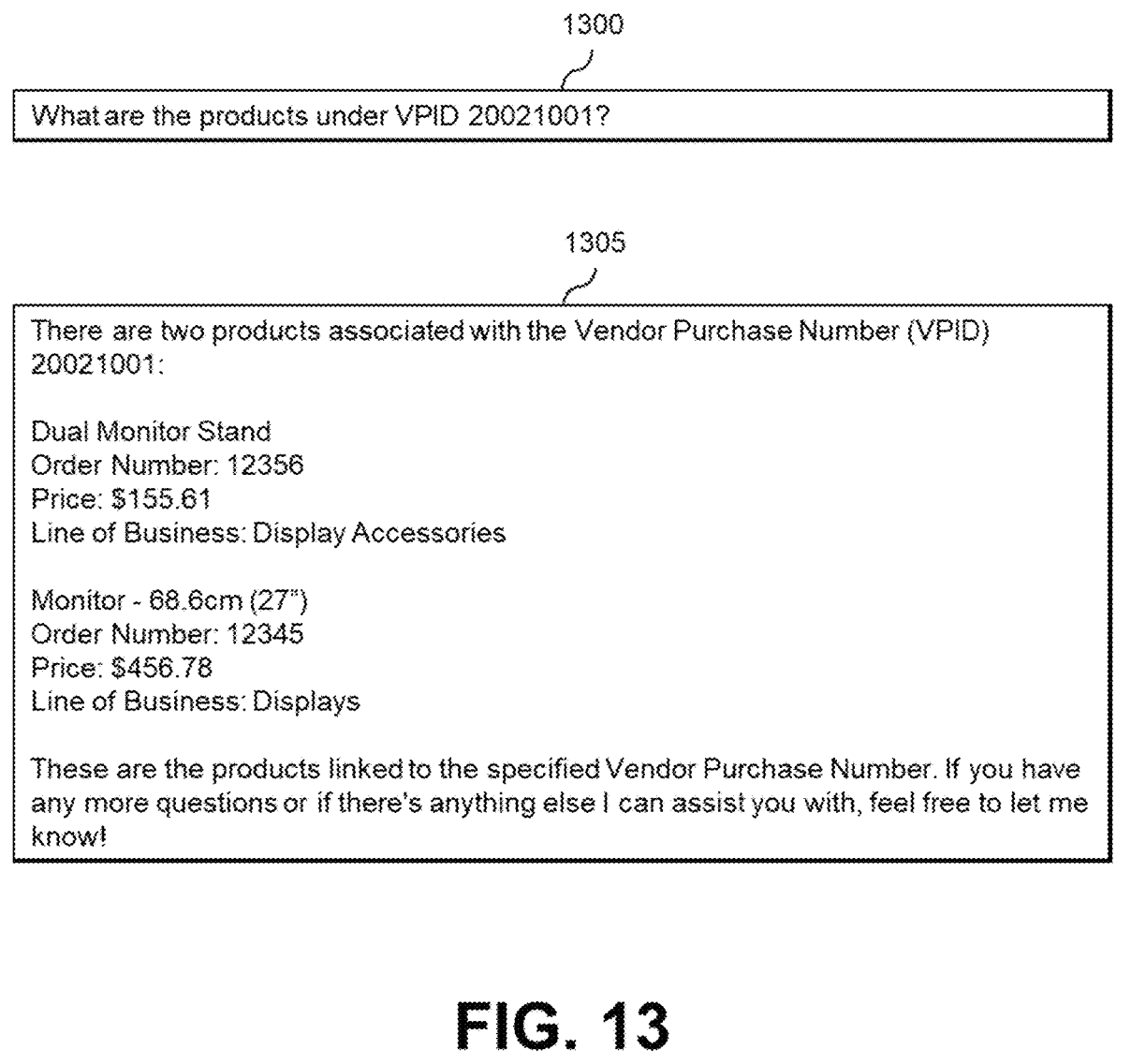

What are the products under VPID 20021001?

1305

There are two products associated with the Vendor Purchase Number (VPID) 20021001:

Dual Monitor Stand
Order Number: 12356
Price: $155.61
Line of Business: Display Accessories Monitor - 68.6cm (27")
Order Number: 12345
Price: $456.78
Line of Business: Displays These are the products linked to the specified Vendor Purchase Number. If you have any more questions or if there's anything else I can assist you with, feel free to let me know!

| SON | EDD | ORD DATE | AMT | PROD DESC | LOB | VPID | CUST NAME | CUST ID |
|---|---|---|---|---|---|---|---|---|
| 12345 | 20/10/2023 00:00:00 | 18/10/2023 10:37:30 | 456.78 | MONITOR - 68.6CM (27") | DISPLAYS | 20021001 | XYZ CORP. | 23456 |
| 12356 | 23/10/2023 00:00:00 | 18/10/2023 10:37:30 | 155.61 | DUAL MONITOR STAND | DISPLAY ACCESSORIES | 20021001 | XYZ CORP. | 23456 |
| 12367 | 02/11/2023 00:00:00 | 18/10/2023 10:37:30 | 856.12 | DESKTOP COMPUTER | DESKTOPS | 20021003 | XYZ CORP. | 23456 |
| 12389 | 31/10/2023 00:00:00 | 11/10/2023 15:57:36 | 22145.60 | MOBILE WORKSTATION | MOBILE WORKSTATIONS | 20081450 | XYZ CORP. | 23456 |
| 12401 | 31/10/2023 00:00:00 | 11/10/2023 15:57:36 | 10334.14 | MOBILE WORKSTATION | MOBILE WORKSTATIONS | 20081450 | XYZ CORP. | 23456 |
| 12100 | 13/10/2023 00:00:00 | 20/09/2023 09:40:46 | 7477.34 | CHROMEBOOK 3456 | CHROME | 20082455 | ABC CORP | 14276 |
| 12105 | 06/09/2023 00:00:00 | 11/08/2023 10:02:01 | 4734.93 | CHROMEBOOK 3456 | CHROME | 20082179 | ABC CORP | 14276 |
| 12110 | 31/08/2023 00:00:00 | 25/07/2023 12:00:56 | 6743 | CHROMEBOOK 3456 | CHROME | 20080430 | ABC CORP | 14276 |
| 10455 | 13/06/2023 00:00:00 | 17/05/2023 12:16:31 | 39418.24 | CHROMEBOOK 3456 | CHROME | 20091002 | ABC CORP | 14276 |
| 10511 | 13/06/2023 00:00:00 | 17/05/2023 12:16:31 | 4057.76 | MONITOR - 68.6CM (27") | DISPLAYS | 20091002 | ABC CORP | 14276 |

SON: SALES ORDER NUMBER
EDD: ESTIMATED DELIVERY DATE
ORD DATE: ORDER DATE
AMT: AMOUNT
PROD DESC: PRODUCT DESCRIPTION
LOB: LINE OF BUSINESS
VPID: VENDOR PRODUCT IDENTIFIER
CUST NAME: CUSTOMER NAME
CUST ID: CUSTOMER IDENTIFIER

```
from llama_index import VectorStoreIndex, SimpleDirectoryReader, StorageContext
from llama_index.vector_stores import DeepLakeVectorStore

# construct vector store and customize storage context
storage_context = StorageContext.from_defaults(
    vector_store=DeepLakeVectorStore(dataset_path="./user/documentstore")
)
```

1605

```
loader = XXXReader()
documents =
loader.load_data(file=Path('./user/documentstore/ABCCoprOrderDocument.txt'))
index = VectorStoreIndex.from_documents(documents)
```

1610

```
index.storage_context.persist(persist_dir="./user/documentstore/142766937/abccorp-
order")
```

FIG. 16

MACHINE LEARNING-BASED PROCESSING OF QUERIES USING STRUCTURED DATA CONVERTED TO NATURAL LANGUAGE DOCUMENTS

BACKGROUND

As the value and use of information continues to increase, individuals and businesses seek additional ways to process and store information. Information processing systems may be used to process, compile, store and communicate various types of information, including through the use of artificial intelligence (AI) and machine learning (ML). Large language models (LLMs) are a type of AI system that uses ML algorithms to process vast amounts of natural language text data. LLMs may be used to perform various natural language processing (NLP) tasks, including text classification, text summarization, text generation, named entity recognition, text sentiment analysis, and question answering.

SUMMARY

Illustrative embodiments of the present disclosure provide techniques for machine learning-based processing of queries using structured data converted to natural language documents.

In one embodiment, an apparatus comprises at least one processing device comprising a processor coupled to a memory. The at least one processing device is configured to obtain, at an application interface, a query, the query being directed to structured data in one or more structured data sources. The at least one processing device is also configured to convert at least a portion of the structured data extracted from the one or more structured data sources into one or more natural language documents, to associate the one or more natural language documents with one or more context entities and one or more differentiating entities in a hierarchical database defining a hierarchy of the one or more differentiating entities and the one or more context entities, and to determine a tenant boundary of the query, the tenant boundary specifying at least one of the one or more context entities associated with at least one of the one or more differentiating entities in the hierarchical database. The at least one processing device is further configured to generate a prompt for processing utilizing at least one machine learning model, the prompt identifying the query and a subset of the one or more natural language documents selected based at least in part on the determined tenant boundary, to process the prompt utilizing the at least one machine learning model to generate an answer for the query, and to provide, via the application interface, the generated answer to the query.

These and other illustrative embodiments include, without limitation, methods, apparatus, networks, systems and processor-readable storage media.

BRIEF DESCRIPTION OF THE DRAWINGS

FIG. 3 shows an online transaction processing database with a single order for a customer in an illustrative embodiment.

FIG. 7 shows a natural language linkers configurator for data from an online transaction processing database in an illustrative embodiment.

FIG. 10 shows a natural language document produced using an extract, transform to document, load process with and without large language model-based tuning in an illustrative embodiment.

FIG. 11 shows an online transaction processing database with multiple orders for a customer in an illustrative embodiment.

FIG. 12 shows a natural language document produced using an extract, transform to document, load process with large language model-based tuning in an illustrative embodiment.

FIG. 13 shows a query and answer produced using a large language model which utilizes an online prompt-driven analytical processing data modeling tool in an illustrative embodiment.

FIG. 14 shows an online transaction processing database with orders for multiple customers in an illustrative embodiment.

FIG. 16 shows pseudocode for online prompt-driven analytical processing of natural language queries using structured data converted into natural language documents with an extract, transform to document, load process in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
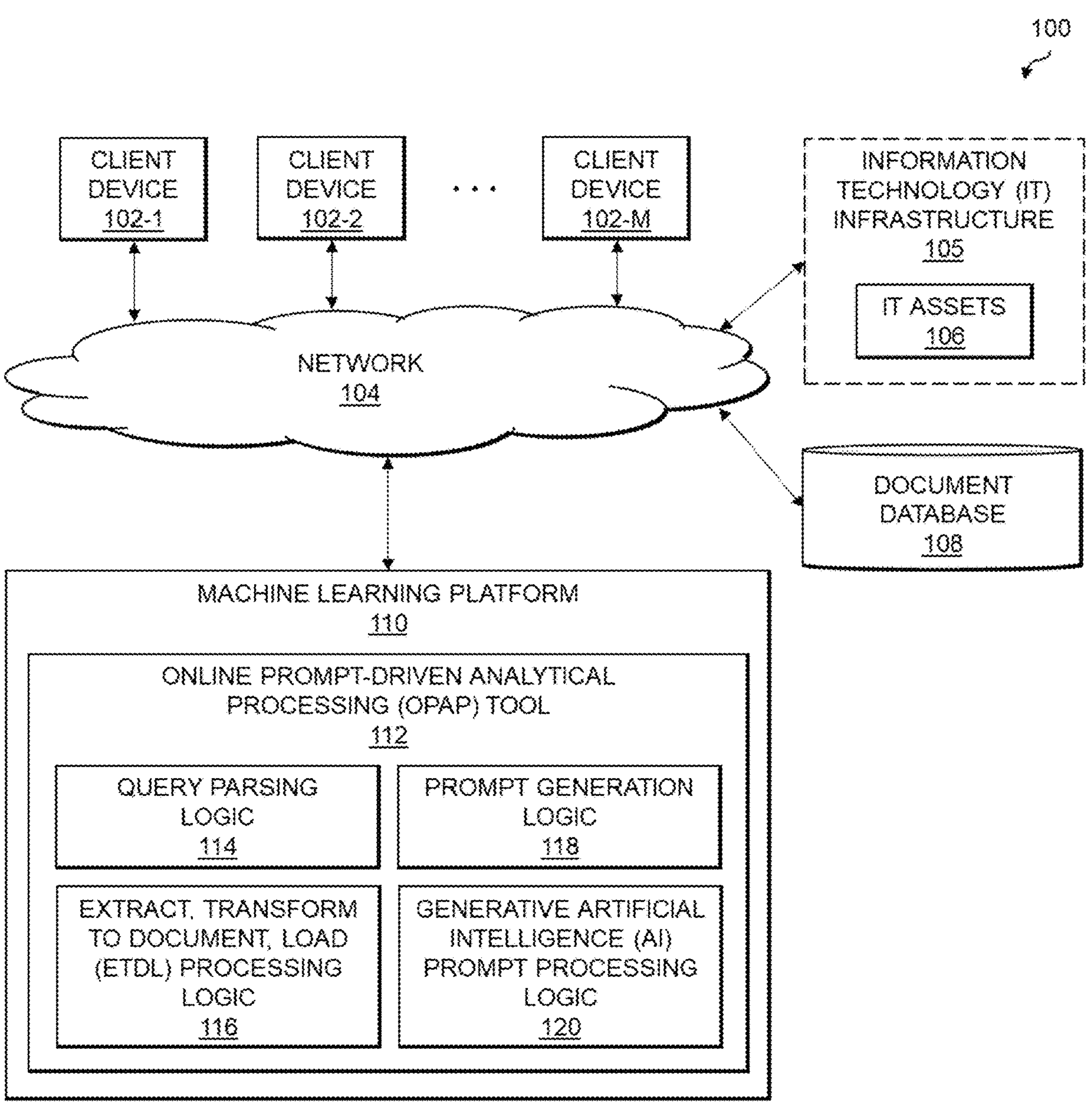
FIG. 1 is a block diagram of an information processing system configured for machine learning-based processing of queries using structured data converted to natural language documents in an illustrative embodiment.

FIG. 1 shows an information processing system 100 configured in accordance with an illustrative embodiment. The information processing system 100 is assumed to be built on at least one processing platform and provides functionality for machine learning-based processing of queries using structured data converted to natural language documents. As used herein, a "natural language" document refers to a document whose content includes natural language text. It should be appreciated, however, that a natural language document may also include additional content other than natural language text. Further, a natural language document can include a portion of a single document or a combination of multiple documents, and is not restricted to any particular document format. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, a document database 108, and a machine learning platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the machine learning platform 110 is used for an enterprise system. For example, an enterprise may subscribe to or otherwise utilize the machine learning platform 110 for performing searches or queries related to structured data utilizing a generative artificial intelligence (AI) model such as a large language model (LLM). The structured data may be processed by the machine learning platform 110 utilizing an online prompt-driven analytical processing (OPAP) tool 112 which is configured to convert the structured data into natural language documents, stored in document database 108, which are understandable by a generative AI model such as an LLM. The structured data may include data that is produced by or otherwise related to operation of the IT assets 106 of the IT infrastructure 105, etc. For example, users of the client devices 102 may submit searches or queries (e.g., natural language queries) to the machine learning platform 110 to perform intelligent searching of structured data converted to natural language documents stored in the document database 108, where such documents may but are not required to be produced by or otherwise associated with operation of the IT assets 106 of the IT infrastructure 105. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The document database 108 is configured to store and record various information that is utilized by the machine learning platform 110 and the client devices 102. Such information may include, for example, information that is collected regarding operation of the IT assets 106 of the IT infrastructure 105 (e.g., support tickets, logs, orders, etc.). The machine learning platform 110 may be utilized by the client devices 102 to perform searches of such information in order to perform troubleshooting and remediation of issues encountered on the IT assets 106 of the IT infrastructure 105, for allowing customers or other users to query and determine status information for orders and subscriptions placed with an enterprise, etc. The client devices 102 may utilize the machine learning platform 110 to query information in the document database 108 to assist in performing configuration of the IT assets 106 of the IT infrastructure 105, to perform troubleshooting and remediation of issues encountered on the IT assets 106 of the IT infrastructure 105, to support management and remediation of issues relating to orders and subscriptions placed with an organization, etc. The document database 108 may also store any documents or other information that is desired to be searched utilizing the machine learning platform 110, including information that is unrelated to the IT assets 106 of the IT infrastructure 105.

The document database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the machine learning platform 110, as well as to support communication between the machine learning platform 110 and other related systems and devices not explicitly shown.

The machine learning platform 110 may be provided as a cloud service that is accessible by one or more of the client devices 102 to allow users thereof to perform searching of structured data utilizing a generative AI model such as an LLM. The client devices 102 may be configured to access or otherwise utilize the machine learning platform 110 (e.g., to perform searches, including searches related to configuration of the IT assets 106 of the IT infrastructure 105, operation of the IT assets 106 of the IT infrastructure 105, issues encountered on the IT assets 106 of the IT infrastructure 105, troubleshooting and remediation of issues encountered on the IT assets 106 of the IT infrastructure 105, querying status information for orders and subscriptions placed with an organization, etc.). In some embodiments, the client devices 102 are assumed to be associated with software developers, system administrators, IT managers or other authorized personnel responsible for managing the IT assets 106 of the IT infrastructure 105. In some embodiments, the IT assets 106 of the IT infrastructure 105 are owned or operated by the same enterprise that operates the machine learning platform 110. In other embodiments, the IT assets 106 of the IT infrastructure 105 may be owned or operated by one or more enterprises different than the enterprise which operates the machine learning platform 110 (e.g., a first enterprise provides search functionality support for multiple different customers, businesses, etc.). Various other examples are possible.

In some embodiments, the client devices 102 and/or the IT assets 106 of the IT infrastructure 105 may implement host agents that are configured for automated transmission of information with the document database 108 and the machine learning platform 110 regarding searches (e.g., queries, answers to queries, etc.). It should be noted that a "host agent" as this term is generally used herein may comprise an automated entity, such as a software entity running on a processing device. Accordingly, a host agent need not be a human entity.

The machine learning platform 110 in the FIG. 1 embodiment is assumed to be implemented using at least one processing device. Each such processing device generally comprises at least one processor and an associated memory, and implements one or more functional modules or logic for controlling certain features of the machine learning platform 110. In the FIG. 1 embodiment, the machine learning platform 110 implements an OPAP tool 112. The OPAP tool 112 comprises query parsing logic 114, extract, transform to document, load (ETDL) processing logic 116, prompt generation logic 118 and generative AI prompt processing logic 120. The query parsing logic 114 is configured to obtain queries (e.g., natural language queries) from the client devices 102 which are directed to structured data that is stored in or more data sources. The ETDL processing logic 116 is configured to convert the structured data into one or more natural language documents, which may be vectorized and stored in the document database 108. The prompt generation logic 118 is configured to determine a tenant boundary for a given one of the obtained queries (e.g., based on identifying a logged in user of a given one of the client devices 102 that is the source of the given query), where the tenant boundary may be based on differentiating entities and context entities within a hierarchical database (e.g., a graph database) that is maintained as part of the document database 108. The tenant boundary is used to identify particular ones of the vectorized documents to embed along with the given query as a prompt that is supplied to a generative AI model such as an LLM. The generative AI prompt processing logic 120 is configured to process the prompt with the generative AI model to obtain an answer (e.g., in natural language format) for presentation to the one of the client devices 102 that is the source of the given query.

At least portions of the OPAP tool 112, the query parsing logic 114, the ETDL processing logic 116, the prompt generation logic 118 and the generative AI prompt processing logic 120 may be implemented at least in part in the form of software that is stored in memory and executed by a processor.

It is to be appreciated that the particular arrangement of the client devices 102, the IT infrastructure 105, the document database 108 and the machine learning platform 110 illustrated in the FIG. 1 embodiment is presented by way of example only, and alternative arrangements can be used in other embodiments. As discussed above, for example, the machine learning platform 110 (or portions of components thereof, such as one or more of the OPAP tool 112, the query parsing logic 114, the ETDL processing logic 116, the prompt generation logic 118 and the generative AI prompt processing logic 120) may in some embodiments be implemented internal to the IT infrastructure 105.

The machine learning platform 110 and other portions of the information processing system 100, as will be described in further detail below, may be part of cloud infrastructure.

The machine learning platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the document database 108 and the machine learning platform 110 or components thereof (e.g., the OPAP tool 112, the query parsing logic 114, the ETDL processing logic 116, the prompt generation logic 118 and the generative AI prompt processing logic 120) may be implemented on respective distinct processing platforms, although numerous other arrangements are possible. For example, in some embodiments at least portions of the machine learning platform 110 and one or more of the client devices 102, the IT infrastructure 105, the IT assets 106 and/or the document database 108 are implemented on the same processing platform. A given client device (e.g., 102-1) can therefore be implemented at least in part within at least one processing platform that implements at least a portion of the machine learning platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the document database 108 and the machine learning platform 110, or portions or components thereof, to reside in different data centers. Numerous other distributed implementations are possible. The machine learning platform 110 can also be implemented in a distributed manner across multiple data centers.

Additional examples of processing platforms utilized to implement the machine learning platform 110 and other components of the information processing system 100 in illustrative embodiments will be described in more detail below in conjunction with FIGS. 18 and 19.

It is to be understood that the particular set of elements shown in FIG. 1 for machine learning-based processing of queries using structured data converted to natural language documents is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for machine learning-based processing of queries using structured data converted to natural language documents will now be described in more detail with reference to the flow diagram of FIG. 2. It is to be understood that this particular process is only an example, and that additional or alternative processes for machine learning-based processing of queries using structured data converted to natural language documents may be used in other embodiments.

In this embodiment, the process includes steps 200 through 212. These steps are assumed to be performed by the machine learning platform 110 utilizing the OPAP tool 112, the query parsing logic 114, the ETDL processing logic 116, the prompt generation logic 118 and the generative AI prompt processing logic 120. The process begins with step 200, obtaining at an application interface a query, the query being directed to structured data in one or more structured data sources. The one or more structured data sources may comprise at least one of an online transaction processing (OLTP) database and an online analytical processing (OLAP) database.

In step 202, at least a portion of the structured data extracted from the one or more structured data sources is converted into one or more natural language documents. Converting the portion of the structured data extracted from the one or more data sources into the one or more natural language documents may utilize a natural language linker configuration template, the natural language linker configuration template specifying an ordering for creating natural language from content in two or more columns of the structured data. The natural language linker configuration template may further specify, for at least one of the two or more columns of the structured data, at least one of a suffix and a prefix to be appended to the content of the at least one of the two or more columns of the structured data. The natural language linker configuration template may further specify whether respective ones of the two or more columns of the structured data represent at least one of the one or more differentiating entities. Converting the portion of the structured data from the one or more data sources into the one or more natural language documents further comprises tuning an output of the natural language linker configuration template utilizing an LLM. Converting the portion of the structured data from the one or more data sources into the one or more natural language documents may further comprise testing an output of the natural language linker configuration template utilizing one or more test queries.

In step 204, the one or more natural language documents are associated with one or more context entities and one or more differentiating entities in a hierarchical database defining a hierarchy of the one or more differentiating entities and the one or more context entities.

In step 206, a tenant boundary of the query is determined, the tenant boundary specifying at least one of the one or more context entities associated with at least one of the one or more differentiating entities in the hierarchical database. Determining the tenant boundary of the query may comprise determining the at least one of the one or more differentiating entities in the hierarchical database based at least in part on identifying a source that submitted the query to the application interface. Determining the tenant boundary of the query may also or alternatively comprise determining the at least one of the one or more differentiating entities in the hierarchical database based at least in part on identifying a user that is logged in to the application interface. Determining the tenant boundary of the query may further or alternatively comprise determining the at least one of the one or more context entities in the hierarchical database based at least in part on applying natural language processing to text of the query.

In step 208, a prompt for processing utilizing at least one machine learning model is generated, the prompt identifying the query and a subset of the one or more natural language documents selected based at least in part on the determined tenant boundary. The one or more natural language documents may be stored in a vectorized format in a vector database, the one or more natural language documents being associated with vector indexes in the hierarchical database, the vector indexes being associated with respective ones of the one or more context entities in the hierarchical database. Generating the prompt may comprise utilizing the vectorized format of the identified subset of the one or more natural language documents as embeddings.

In step 210, the prompt is processed utilizing the at least one machine learning model to generate an answer for the query. The at least one machine learning model may comprise a generative AI model, an LLM, etc.

In step 212, the generated answer to the query is provided via the application interface.

Figure 2:
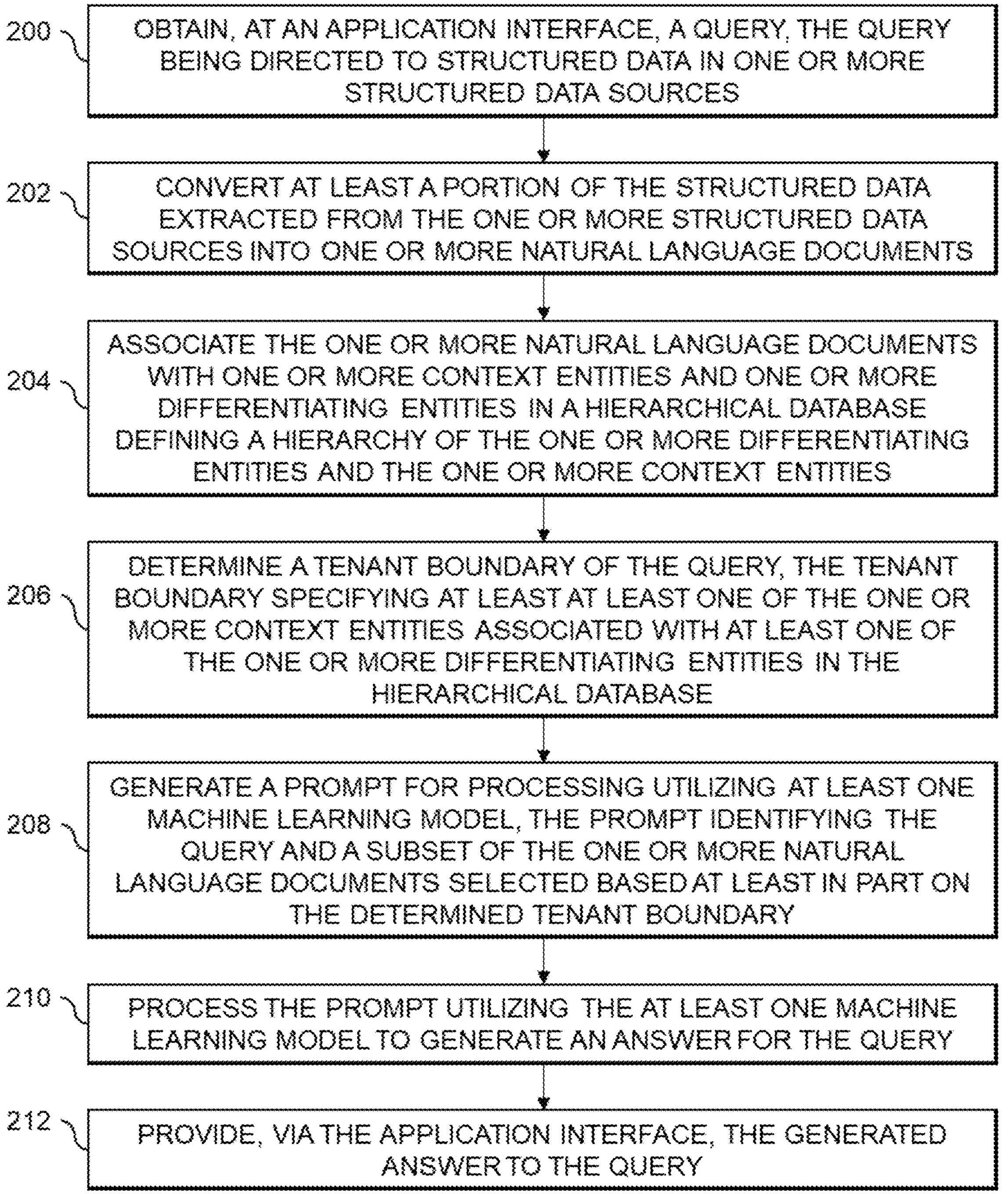
FIG. 2 is a flow diagram of an exemplary process for machine learning-based processing of queries using structured data converted to natural language documents in an illustrative embodiment.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different processes, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Data management may utilize various types of database systems and data models, including Online Transaction Processing (OLTP), Online Analytical Processing (OLAP), Online Analytical Mining (OLAM), and Data Mesh models. As organizations grapple with massive volumes of data and the demand for real-time insights, there is a need for innovative data processing models. Existing data processing models have various limitations, particularly when used with artificial intelligence (AI) and machine learning (ML) models such as Large Language Models (LLMs). The sheer complexity, scale and dynamic nature of LLM-based vectorized AI searches requires technical solutions for data storage, retrieval and analysis. The technical solutions described herein provide a data processing model, referred to as Online Prompt-Driven Analytical Processing (OPAP) tool (e.g., the OPAP tool 112), that caters to next-generation data processing models tailored specifically for the unique requirements of AI/ML, including generative AI. By amalgamating the strengths of OLTP, OLAP, OLAM and Data Mesh modeling while addressing their inherent limitations, the technical solutions aim to redefine how databases support the burgeoning field of new generative AI-based data processing and retrieval. This can help across an organization to enable a generative AI culture, without worrying about training a generative AI model, including in digital ordering and supply chain areas.

The OPAP tool provides an LLM-ready database model, which implements proper data segregation (e.g., across customers, tenants or other entities). Significant resources are expended to enable generative AI capabilities across an organization, including order and supply chain areas. Organizations may rely on structured data models for transactions, which can hinder AI/ML-based innovations. With the OPAP tool, no special isolated embeddings need to be created for a specific task. The OPAP tool may utilize an Extract, Transform to Document, Load (ETDL) process to take care of proper vectorization of the transactional data. Thus, once a customer, user or other entity places an order or subscription, that entity can utilize a License Manager application to ask what has happened to the license for that order or subscription. The OPAP tool makes the data available in an LLM-ready format, such that an LLM can be used to reply (e.g., with license status information for that order or subscription). Entities can further perform proactive analytics using natural language prompts to the OPAP tool, such as querying "why is this order in hold?" without requiring any traditional AI model training.

Once the OPAP tool is implemented across an organization, or at least some areas of an organization such as order and supply chain management, the technical solutions can provide various technical advantages, including reducing the cost of enabling generative AI across such areas of the organization (e.g., order and supply chain management). Further, no special effort is required for enabling the generative AI effort, as the transactional order and supply chain data will automatically convert to an LLM-ready model, from which entities can ask questions (e.g., using natural language queries or prompts). The OPAP tool can thus enable various use cases, such as order status tracking, analyzing order holds and proactive remedies for order holds, providing a transactional view of raw materials provided by suppliers, providing proactive remedies for supply chain issues which leverage the power of LLM without worrying about creating data and training a model, determining backlog order details, etc. These and other use cases allow IT teams to concentrate on functionalities rather than the data strategy for generative AI. The OPAP tool also enables order and supply chain information to be queried (e.g., using natural language prompts) with data segregation (e.g., based on customer, user or other entity). The technical solutions can further open up the minds of engineers and an organization, as they do not need to spend the time to get the data and create embeddings and can instead spend time to get functions implemented using "just" natural language prompts.

OLTP, OLAP and Data Mesh data processing models perform well for applications such as web applications, desktop legacy AI/ML models (e.g., regression, forecasting, etc.) and traditional chatbots for an organization. These and other applications may rely on intent derivation of customer or other user queries, and then calling an application programming interface (API) to get relevant data from structured data in the back end, with the result being provided to the customer or other user. LLMs, however, have brought significant changes. LLMs have the ability to infer user queries and get the right answers from a large corpus of data (e.g., millions or billions of documents). LLMs, however, understand the natural text rather than the structured data.

Conventional data processing models do not support LLM-based data analytics. OLTP and OLAP data processing models, for example, have structured column-based or row-based data, which is understandable for Structure Query Language (SQL) queries. Structured data does not "mean" anything to an LLM, as it is in a columnar or row format with some column names that are not necessarily in natural language that is understandable by the LLM (e.g., ORD-_NUM stands for Order Number, CUST_ID stands for Customer Identifier, etc.). In generative AI, the organization's data may be vectorized, to produce what is referred to as embeddings, and used to instruct the LLM to do a vector search only in that data when it gives answers. If the structured data is used as embeddings, however, the vectorization goes wrong and the LLM struggles. Conventional data models thus do not support generative AI requirements for enterprise organizations that may create documents which are vectorized in silos, or end up with creating API calls after intent derivation in most generative AI use cases. Conventional structured data models thus limit the effective use of generative AI, including LLMs.

Due to the limitations of enterprise data models (e.g., OLTP and OLAP), LLM solutions in the enterprise may be limited to intent derivation and chatbots for most use cases (e.g., where an LLM is used heavily for marketing content, which is already in a document format and usually saved to document stores). Across an organization, significant resources may be expended to create APIs and/or create data for LLM vectorization for specific use cases. FIG. 3 shows an OLTP database 300 for an "order" application, which includes columns for: SON (Sales Order Number), EDD (Estimated Delivery Date), ORD DATE (Order Date), AMT (Amount), PROD DESC (Product Description), LOB (Line of Business), VPID (Vendor Product Identifier), CUST NAME (Customer Name) and CUST ID (Customer Identifier). If the OLTP database 300 is loaded in an LLM as an embedding (e.g., a vector), the vector cosine distance between this data will not be anywhere near accurate, as it does not understand the relations, and the LLM will not understand that data (e.g., the LLM may view "SON" as relating to a father and son, EDD or ORD DATE may have "no meaning" to the LLM, etc.).

Figure 4:
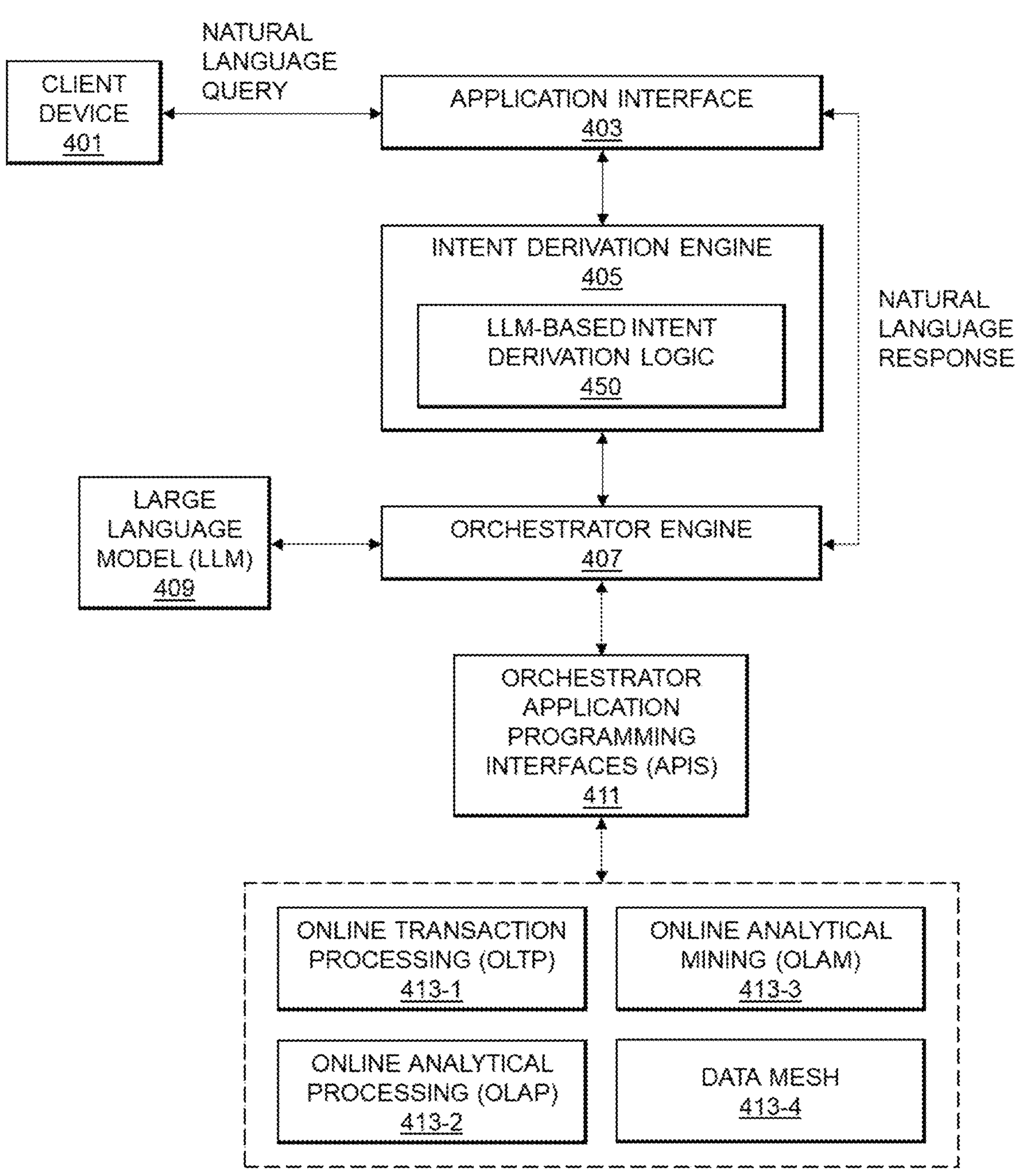
FIG. 4 shows a system for large language model-based processing of natural language queries in an illustrative embodiment.

FIG. 4 shows a system 400, including a client device 401, an application interface 403, an intent derivation engine 405 implementing LLM-based intent derivation logic 450, an orchestrator engine 407, an LLM 409, and orchestrator APIs 411 which are used to access OLTP 413-1, OLAP 413-2, OLAM 413-3 and Data Mesh 413-4 models (collectively, data models 413). Here, the LLM 409 is limited or used only for "beautification" of the language and the context persistence. The client device 401 presents a natural language query to the application interface 403, which accesses the intent derivation engine 405 and an orchestrator engine 407 in order to return a natural language response. In the system 400, the LLM 409 is under-utilized as it is used for "only" natural language creation (e.g., some cases with intent derivation). Thus, the system 400 needs the separate intent derivation engine 405 to be set up, which has a lot of limitations. Further, the orchestrator APIs 411 are with fixed context and structural databases through the data models 413 (e.g., if a user comes with a new intent, a new orchestrator API needs to be created, such that there is typically a 1:1 relationship between intents and the orchestrator APIs 411). In an unstructured world, embeddings are created (e.g., text, photos, videos) and used to obtain results, which may be limited to specific uses cases such as marketing which includes document content, image recognition, etc. However, with structured data like orders and subscription processing, there is no systematic way to tell the LLM 409 the context. Moreover, there is no systematic way to give the boundary of the data for a specific user (e.g., Customer A should see his data only, and Customer B should see his data only—Customer A should not see Customer B's data and Customer B should not see Customer A's data). In the structured data processing world, it may be easy to give boundaries. However, no current model supports user or tenant boundaries of embeddings.

The OPAP tool used in some embodiments provides a data model that is based on what the user will ask in natural language, which determines how prompts to LLMs will be created. The OPAP tool is configured to convert data from a structured data model into unstructured natural language documents that a generative AI model (e.g., an LLM) understands. Thus, instead of an Extract, Transform, Load (ETL) approach, the OPAP tool introduces the concept of Extract, Transform to Document, Load (ETDL) processing for creating embeddings based on a differential entity and one or more context entities which, as will be discussed in further detail below, is used for determining tenant, user or other entity boundaries. The OPAP data model may implement a hierarchical database (e.g., a graph structure) for modeling the relationships between context entities, differentiating entities, embedding indexes and vectorized data.

Figure 5:
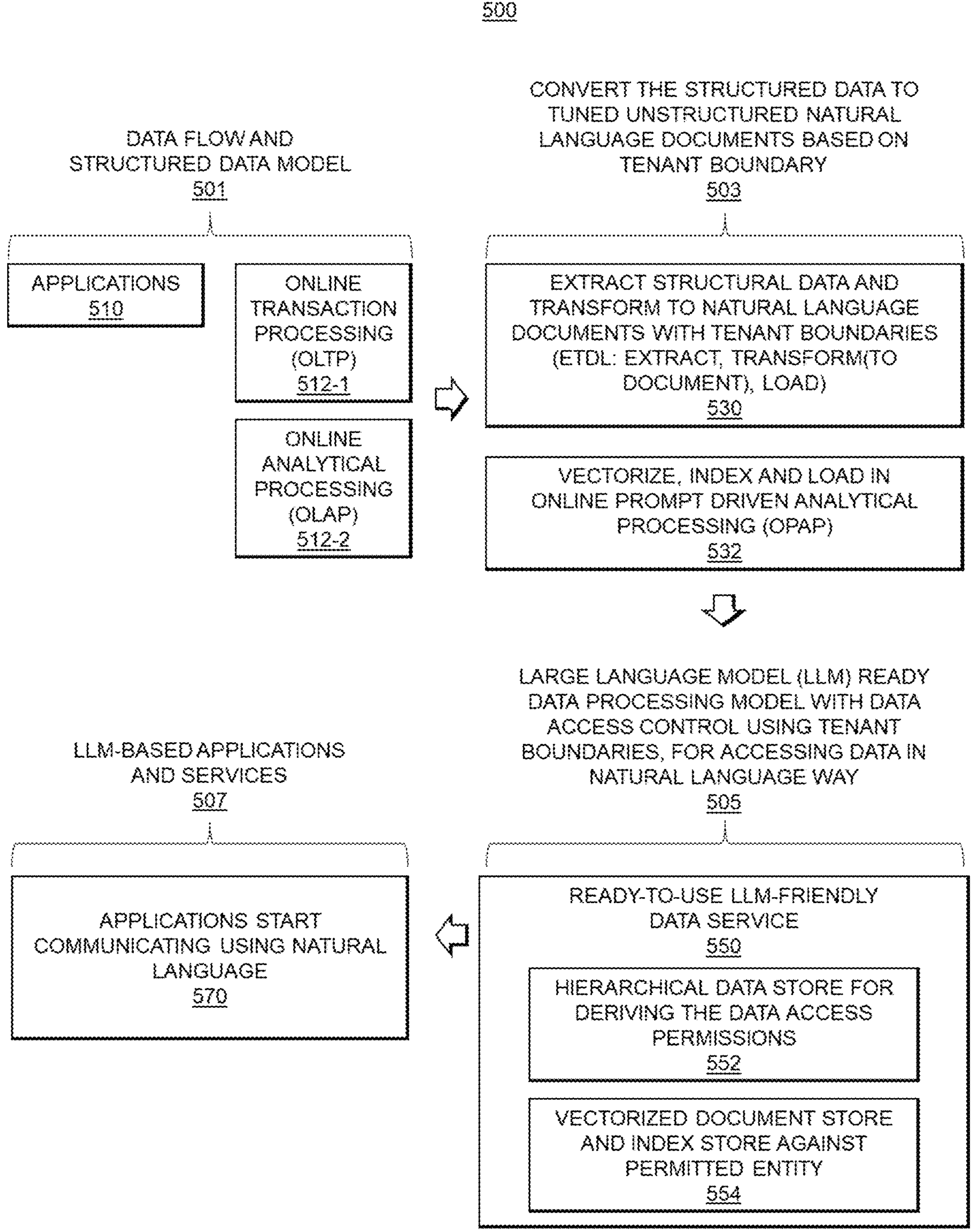
FIG. 5 shows a system flow for online prompt-driven analytical processing of structured data using a large language model in an illustrative embodiment.

FIG. 5 shows a system flow 500 which may be implemented in some embodiments using an OPAP tool. The system flow 500 begins in block 501 with a data flow and structured data model, where applications 510 utilize structured data models such as OLTP 512-1 and OLAP 512-2. In block 503, the structured data is converted to tuned unstructured natural language documents based on tenant (or other user or entity) boundaries. This includes extracting structured data and transforming the extracted structured data to natural language documents with tenant boundaries in block 530 (e.g., using ETDL), as well as vectorizing, indexing and loading into an OPAP data model in block 532. The system flow 500 proceeds in block 505 with providing an LLM-ready data processing model with data access control using tenant boundaries, for accessing data in a natural language way. This includes providing a ready-to-use LLM-friendly data service 550 with a hierarchical data store for deriving the data access permissions 552, and a vectorized document store and index store against permitted entities 554. In block 507, LLM-based applications and services utilize the ready-to-use LLM-friendly data service 550. This includes applications that start communicating using natural language 570.

Figure 6:
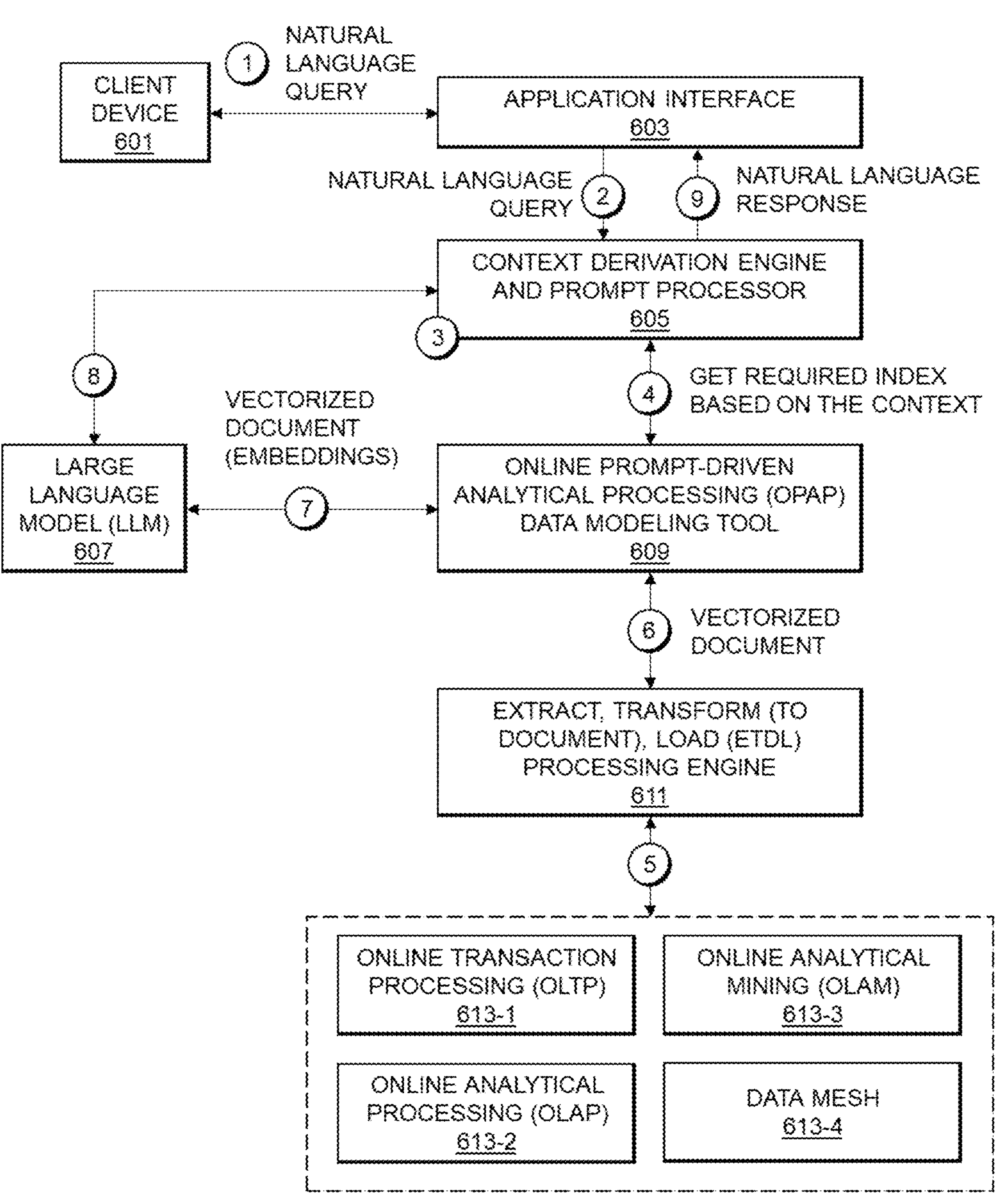
FIG. 6 shows a system for online prompt-driven analytical processing of natural language queries using structured data converted into natural language documents with an extract, transform to document, load process in an illustrative embodiment.

FIG. 6 shows a system 600 including a client device 601, an application interface 603, a context derivation engine and prompt processor 605, an LLM 607, and OPAP data modeling tool 609, and an ETDL processing engine 611 configured to access OLTP 613-1, OLAP 613-2, OLAM 613-3 and Data Mesh 613-4 data models (collectively, data models 613). The system 600 is configured to perform the following processing operations:

1. The client device 601 submits a natural language query to the application interface 603.
2. The application interface 603 forwards the natural language query to the context derivation engine and prompt processor 605.
3. The context derivation engine and prompt processor 605 determines the context (e.g., tenant or other user/entity segmentation) for the natural language query.
4. The context derivation engine and prompt processor 605 obtains a required index from the OPAP data modeling tool 609 based on the context.
5. The ETDL processing engine 611 interacts with the data models 613 to build a hierarchical database and a vector database.
6. The OPAP data modeling tool 609 utilizes the ETDL processing engine 611 to obtain vectorized documents from the ETDL processing engine 611.
7. The OPAP data modeling tool 609 provides the vectorized documents as embeddings to the LLM 607.
8. The context derivation engine and prompt processor 605 provides the natural language query to the LLM 607, and receives a natural language response therefrom.
9. The context derivation engine and prompt processor 605 provides the natural language response to the application interface 603, which may be presented (e.g., via a graphical user interface (GUI), a notification or message, etc.) to the client device 601.

Conventional approaches convert OLTP data to OLAP data using an ETL process or tool. The ETL tool allows developers to extract data from an OLTP database, transform it into a desired schema (e.g., a Star or Snowflake schema), and load it into the OLAP database. For LLM and other generative AI applications, the technical solutions utilize a novel middleware concept of ETDL (e.g., the ETDL processing engine 611), which allows developers to extract data from OLTP, OLAP, OLAM and Data Mesh structured databases or data models, to transform such structured data into a natural language representation of the dataset, and to load this into a vector database with proper identifiers (e.g., indexes).

The "Extract" layer of the ETDL processing engine 611 may utilize "raw data" for natural language queries that is in OLTP, OLAP, OLAM and Data mesh databases or data models 613, according to the use case. If the use case demands real-time answers, then OLTP 613-1 may be the best source. If a user can wait to get a holistic view or aggregated data information as answers, then OLAP 613-2, OLAM 613-3 and Data Mesh 613-4 may be preferred sources. It should be noted, however, that in other cases real-time and holistic views of aggregated data information answers may be provided using other data sources or combinations of data sources. The Data Mesh 613-4, for example, may in some cases give real-time data and thus be a suitable one of the data models 613 for use cases which demand real-time answers. Various other examples are possible. To extract data from these and other data sources, various technologies may be utilized, including but not limited to batch processing, data replication, Kafka messaging, etc.

The "Transform to Document" layer of the ETDL processing engine 611 converts structured labeled data to one or more documents that the LLM 607 can understand based on vectorization. As discussed above, conventional LLMs use embeddings that understand natural language relationships not structured data. The "Transform to Document" layer of the ETDL processing engine 611 converts the structured data into unstructured but well-defined natural language for a specific context. The context may be based on the main actors and entities in a user query (e.g., Customer X and Order Y-Customer X is asking about Order Y, Customer X and Subscription Z-Customer X is asked about Subscription Z, etc.). Conventional OLTP and OLAP databases deal with structured data, and often utilize pre-defined abbreviated column names which the LLM 607 is not able to understand (e.g., SON, ODD, etc. in the OLTP database 300 discussed above).

In the ETDL processing engine 611, the "Extract" layer will fetch the data in the structured format, while the "Transform to Document" layer will convert the data in the structured format into a natural language document. Before converting the data in the structured format, two types of entities may be set, where such entities provide a base for the OPAP data modeling tool 609. The first type of entities are "differentiating" entities, which are used to define the tenant (or other user/entity) boundary of the data that a specific user can access. In the OLTP database 300, for example, the "Customer" is the differentiating entity, in that each customer is only able to see their data. Thus, the tenant boundary in this example is the customer, and the differentiating entity may be the customer identifier (CUST ID). The second type of entity is "context" entities, which define the context of a document that is to be created. Continuing with the previous example, the context may be the "Order" or "Subscription." It should be noted that, in some cases, a data set may contain more than one context entity. The "Transform to Document" layer of the ETDL processing engine 611 will generate a different document for each differentiating entity and its associated context entities. Continuing with the previous example, the data set includes an "Order" and the "Transform to Document" layer of the ETDL processing engine 611 will create a document for the customer of the order.

Consider, by way of example, a data set that includes four customers (CUST A, CUST B, CUST C and CUST D) and two context entities (Order, Subscription). In this example, the "Transform to Document" Layer of the ETDL processing engine 611 will generate 4×2=8 documents, which will be vectorized and mapped in the OPAP data modeling tool 609 as discussed in further detail below. The name "Order" is a "Context Entity" that is mapped to the SON (Sales Order Number) column for the OLTP database 300. This will drive the context mapping from the user's natural language query. The name "Customer" is the "Differentiating Entity" and is mapped to the CUST ID. This will drive the creation of different documents for different instances of the differentiating entity (e.g., different customers).

The "Transform to Document" layer of the ETDL processing engine 611, in some embodiments, includes creating a "natural language linkers configurator" (e.g., the natural language linkers configurator 903 discussed below with respect to FIG. 9) which defines a configuration of the columns in a structured dataset into natural language. FIG. 7 shows a table 700 showing a Natural Language Linkers Configurator for the OLTP database 300. It should be noted that each dataset may be associated with a different natural language linkers configurator, although different datasets may in some cases use natural language linkers configurators which are at least partially the same. The table 700 includes columns for: the column name in the OLTP database 300, prefix and suffixes to append to the textual content of different columns in the OLTP database 300, an indication as to whether each column name in the OLTP database 300 represents a differentiating entity, and a Linker Order (e.g., specifying the ordering for creating natural language text from the content of the columns of the of the OLTP database 300, with any applicable prefixes and suffixes appended to the content as defined). In the example of table 700, several of the column names in the OLTP database 300 have the suffix of "Full_Stop" which corresponds to adding a period or ending a line of text.

A transform-to-document engine (e.g., the transform-to-document engine 901 discussed below with respect to FIG. 9) is used to get the data from a dataset (e.g., using the "Extract" layer of the ETDL processing engine 611), and uses the natural language linkers configurator for the dataset to transform the structured data found in the dataset into natural language. In some embodiments, this provides a "first" or initial level of the natural language conversion. The logic of this first or initial conversion may include the following steps:

1. Read the data set with structured columns, and keep it in memory.
2. Read the natural language linkers configurator for the data set, with the order being determined by the Linker Order column.
3. Get the column of the differentiating entity (e.g., CUST ID in the example of table 700).
4. "Group by" the original data set with the differentiating entity column.
5. Get the first group of the data set.
6. Get first data from the first group.
7. Read the data for the next "Linker Order" in the Natural Language Linkers Configurator (e.g., CUST NAME-XYZ Corp.).
8. Write the prefix, if any (e.g., for CUST NAME, write the prefix "Customer").
9. Write the data (e.g., for the CUST NAME, write "XYZ Corp.")
10. Write the suffix, if any (e.g., for the CUST NAME, the suffix is blank so nothing is done).
11. Get the next data from the first group.
12. Return to step 7, while the "next data" in the first group is not null.
13. Write a natural language document for the first group (e.g., for the "Customer" as the differentiating entity).
14. If the data set includes additional groups (e.g., another "Customer"), then get the next group of the data set.
15. Repeat steps 6-14 until there are no additional groups.
16 End.

The above-described logic will create separate documents for distinct combinations of differentiating entities and context entities (e.g., one document will be created for each "Customer" and their "Orders"). Separate context entities are created which are mapped to each of the created documents (e.g., "Order" is the context entity for the differentiating entity "Customer").

Next, the generated documents are tuned against the LLM being utilized. Each LLM may train the data in a different way. To tune the created documents for a specific LLM, the documents may be added as embedding in prompts to the LLM, which asks to create a "Concise Document" (e.g., to make the document as small as possible). The concise documents are verified for correctness. If the concise documents are not correct, then the configuration (e.g., the associated natural language linkers configurator) is adjusted and the tuning process is repeated. Once the concise documents are correct, the generated documents are embedded again, and various test case queries are submitted to the LLM and the answers are verified for correctness. If any of the answers are incorrect, the configuration (e.g., the associated Natural Language Linkers Configurator) is adjusted accordingly. The final document is then taken, and used to adjust the suffixes and prefixes of the associated natural language linkers configurator as desired. It should be noted that this tuning process may be automated through the use of a reinforcement model (e.g., a ML-based reinforcement learning framework).

Figure 8:
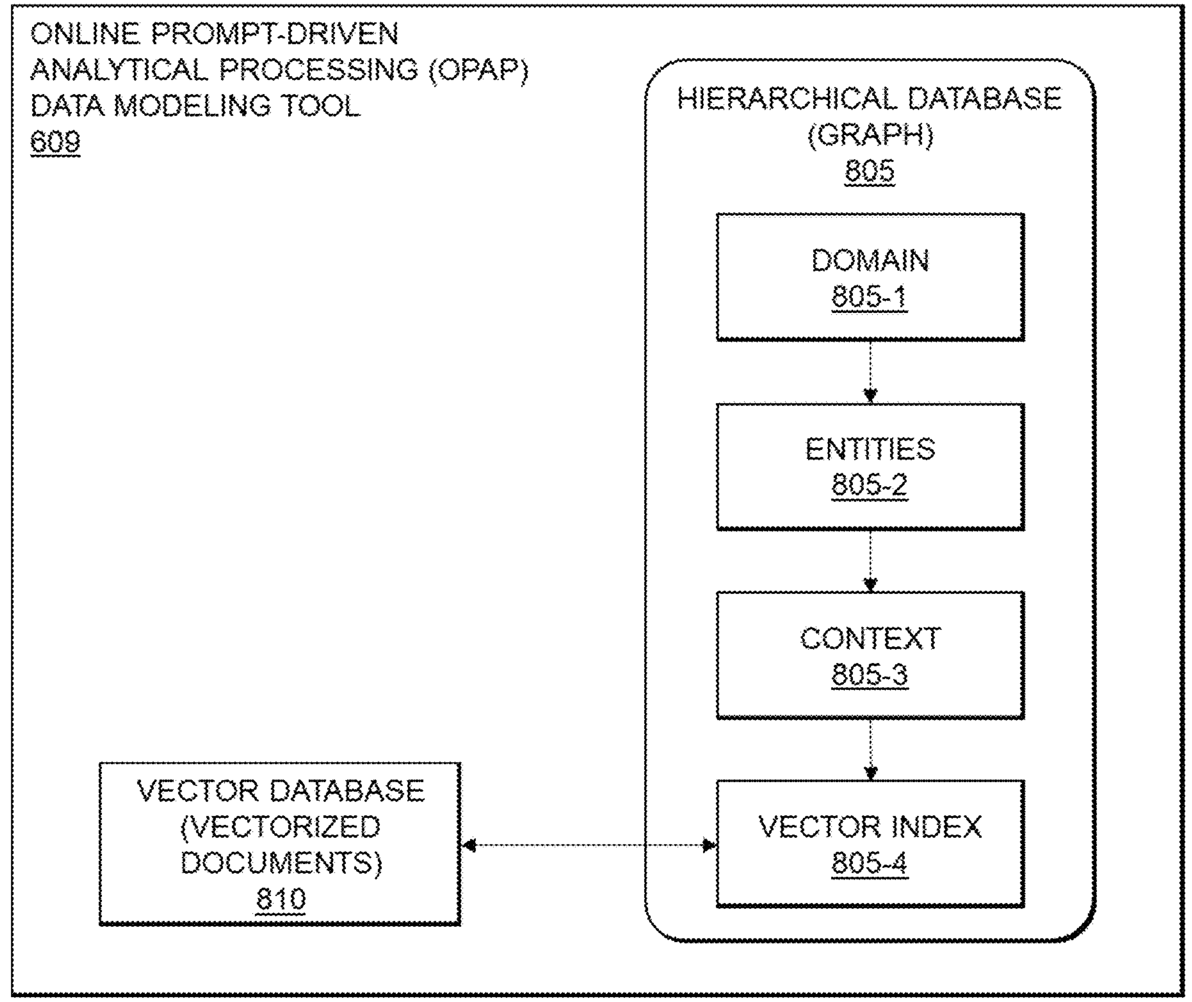
FIG. 8 shows an online prompt-driven analytical processing data modeling tool implementing a hierarchical database and a vector database in an illustrative embodiment.

The OPAP data modeling tool 609 is used for loading the documents created using the "Transform to Documents" layer of the ETDL processing engine 611. FIG. 8 shows the OPAP data modeling tool 609 of FIG. 6, which implements a hierarchical database 805 (also referred to as a graph database) and a vector database 810. The hierarchical database 805 maintains the hierarchical relationships, including domain 805-1, entities 805-2, context 805-3 and vector index 805-4. The vector database 810 is where the documents created using the "Transform to Documents" layer of the ETDL processing engine 611 are added and stored as vectorized documents.

Figure 9:
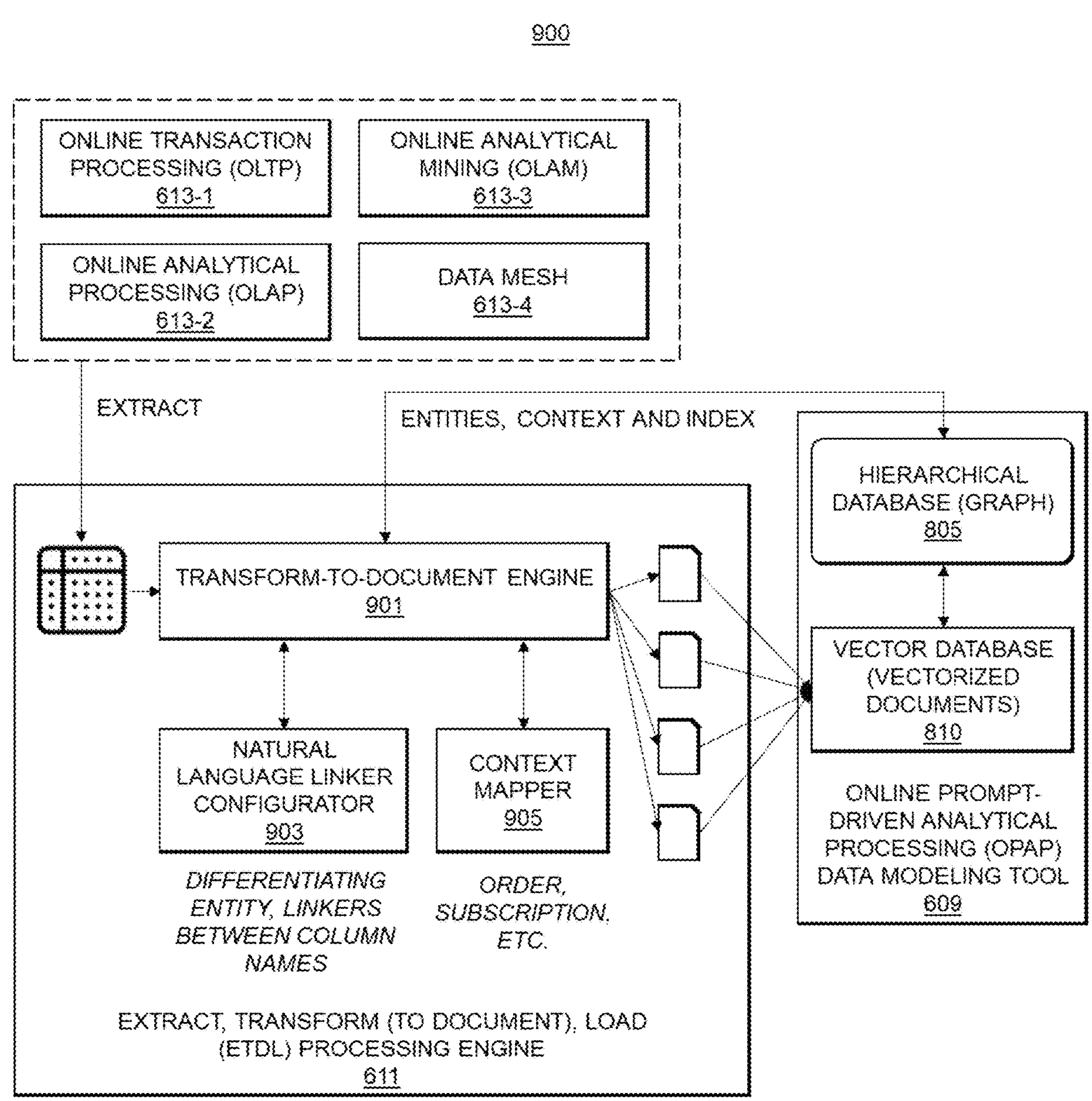
FIG. 9 shows a system flow for online prompt-driven analytical processing of natural language queries using structured data converted into natural language documents with an extract, transform to document, load process in an illustrative embodiment.

FIG. 9 shows a system flow 900 for the overall process within the system 600, where the ETDL processing engine 611 extracts structured data from the data models 613, and utilizes a transform-to-document engine 901 that is based on a natural language linker configurator 903 and a context mapper 905 to create natural language documents, which are vectorized documents in the vector database 810 of the OPAP data modeling tool 609 in accordance with the hierarchical relationships specified in the hierarchical database 805. The natural language linker configurator 903 provides information regarding the differentiating entity for a particular structured data set, as well as the linkers between column names of the structured data set. The table 700 of FIG. 7, discussed above, provides an example of the natural language linker configurator instance for the OLTP database 300 of FIG. 3. The context mapper 905 provides context entities for the structured data set. In the OLTP database 300 of FIG. 3, the context entities include order, subscription, etc.

As discussed above, a natural language document is created for each differentiating entity (e.g., each customer in the example of the OLTP database 300 of FIG. 3) and each context entity (e.g., orders, subscriptions, etc. in the example of the OLTP database 300 of FIG. 3). Thus, if there are four differentiating entities (e.g., four customers) and two context entities (e.g., order and subscription), then eight natural language documents will be created using the ETDL processing engine 611. In the "Load" layer of the ETDL processing engine 611, each of the created documents is vectorized and loaded into the vector database 810 of the OPAP data modeling tool 609. The index of each document is then obtained and used to create a hierarchy in the hierarchical database 805 (e.g., Domain→Differentiating Entity→Context), followed by mapping the vector index to each context. Each differentiating entity has a different index mapped to it. Thus, information between differentiating entities will not be shared. Following the "Load" layer of the ETDL processing engine 611, the OPAP data modeling tool 609 is ready to serve incoming natural language queries based on the natural language documents produced by the ETDL processing engine 611 (which are stored as vectorized documents in the vector database 810), based on vector searching.

In the application side (e.g., the application interface 603 in the system 600), a customer, user or other entity is logged in via the client device 601 (e.g., to get the customer identification, CUST ID, or other identifier for that user or entity), and user queries (e.g., natural language queries) are received. The high-level context of the user queries is derived to determine context entities. For example, if the user query is "how many orders were placed last month?" then the high-level context entity is "Order." Such context derivation may be performed utilizing Natural Language Processing (NLP) algorithms. The user query and its context are then passed to a query resolver, which will get the index against the differentiating entity (e.g., the logged-in customer, user or other entity) and the context entity (e.g., "Order" continuing with the example above). The index is obtained from the hierarchical database 805 of the OPAP data modeling tool 609, which is used to build a prompt with that index that is provided to the LLM 607. The LLM 607 does a vector search in the vector database 810 only for the index provided with the prompt (e.g., only for a specific differentiating entity and context entity). Continuing with the example above, the LLM 607 will search only for a specific customer and their orders.

An example implementation using the OPAP data modeling tool 609 with a user query directed to the OLTP database 300 of FIG. 3 will now be described. Following the above-described processing in the ETDL processing engine 611, there is one group in the OLTP database 300, and one data set inside that group, which results in creation of a natural language document 1000 as shown in FIG. 10, where column values from the OLTP database 300 are highlighted. The document 1000 is then "tuned" such that it is understandable by the LLM that is to be used. To perform the tuning, the document 1000 may be passed to an LLM (e.g., Llama2) as a prompt with the instruction "Correct English." The resulting "tuned" document 1005 includes minor changes to the language, which are highlighted as shown in FIG. 10. The tuned document 1005 appears correct, and is subject to possible further tuning. The further tuning may include listing out a set of test queries, such as "What is my order number?", "When will I get my order", etc. The tuned document 1005 is embedded in prompts with such test queries and passed to the LLM. If the LLM produces correct answers to the test queries (e.g., "Your order number is 12345." and "You can expect to receive your order on the Expected Delivery Date, which is 20 Oct. 2023"), then no further refinement is needed. If incorrect answers are given, the tuned document 1005 may be refined as needed.

FIG. 11 shows an OLTP database 1100, which has the same column names as the OLTP database 300, but which includes multiple orders for the same customer (e.g., the same "differentiating entity"). Application of the ETDL processing engine 611 according to the above-described algorithm will give the document 1200 shown in FIG. 12, where each paragraph (or bullet point in a bulleted list) corresponds to one of the orders. For clarity of illustration, the document 1200 includes only the first two orders in the OLTP database 1100. Since there are multiple orders in the document 1200, this can be tuned against the LLM to make it concise again and update the natural language linker configurator 903 accordingly. This is tested against an LLM (e.g., Llama2) by providing the prompt 1300 shown in FIG. 13, which results in the output or answer 1305 shown in FIG. 13. Since the answer 1305 includes the desired result, no changes to the natural language linker configurator 903 are needed in this example.

Figure 15:
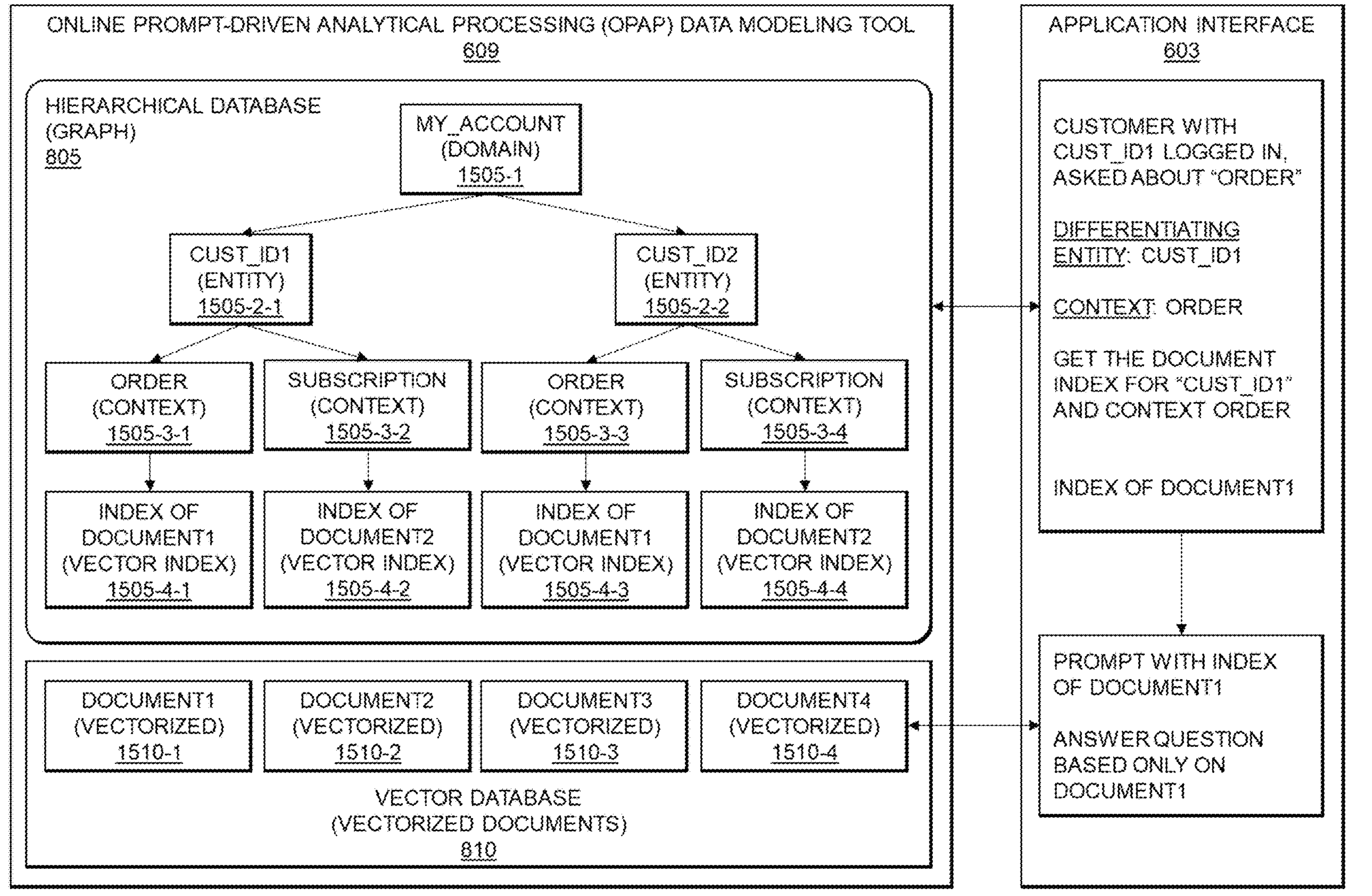
FIG. 15 shows an example of online prompt-driven analytical processing of a natural language query using structured data converted into natural language documents with an extract, transform to document, load process in an illustrative embodiment.

FIG. 14 shows an OLTP database 1400, which has the same column names as the OLTP databases 300 and 1100, but which includes orders for multiple customers (e.g., multiple differentiating entities "ABC Corp." and "XYZ Corp." for the same context entity "Order"). Here, as there are two differentiating entities, the ETDL processing engine 611 will create two documents, one for ABC Corp. and the other for XYZ Corp. In other examples, there may be multiple context entities, such as data sets for orders and subscriptions. In this case, with two differentiating entities (CUST_ID1 for XYZ Corp. and CUST_ID2 for ABC Corp.) and two context entities (e.g., Order and Subscription), then four documents will be created (denoted Document1, Document2, Document3, Document4) as illustrated in FIG. 15. Each of the documents is vectorized, and the vector index of the document is stored in the hierarchical database 805 of the OPAP data modeling tool 609.

As shown in FIG. 15, in this example the hierarchical database 805 of the OPAP data modeling tool 609 includes the domain "MY_ACCOUNT" 1505-1 and differentiating entities 1505-2-1 (CUST_ID1) and 1505-2-2 (CUST_ID2), collectively referred to as differentiating entities 1505-2. For each of the differentiating entities 1505-2, the hierarchical database 805 includes two contexts. The differentiating entity 1505-2-1 (CUST_ID1) includes a first context 1505-3-1 (Order) and a second context 1505-3-2 (Subscription), while the differentiating entity 1505-2-2 (CUST_ID2) includes a first context 1505-3-3 (Order) and a second context 1505-3-4 (Subscription). The contexts 1505-3-1, 1505-3-2, 1505-3-3 and 1505-3-4 (collectively, context entities 1505-3) are associated with respective document indexes 1505-4-1, 1505-4-2, 1505-4-3 and 1505-4-4 (collectively, document indexes 1505-4) for vectorized documents 1510-1, 1510-2, 1510-3 and 1510-4 (collectively, vectorized documents 1510) stored in the vector database 810 of the OPAP data modeling tool 609. Each of the vectorized documents 1510 has a "tenant boundary" of one of the differentiating entities 1505-2 and one of the context entities 1505-3. Data is not shared across the tenant boundaries.

FIG. 15 further illustrates the application interface 603, where it is assumed that a customer with CUST_ID1 is logged in and asks about their orders. The application interface 603 determines that the differentiating entity is CUST_ID1 and the context is Order, and gets form the OPAP data modeling tool 609 the document index for CUST_ID1 and the Order context, which is the index 1505-4-1 associated with vectorized Document1 1510-1. The application interface 603 generates a prompt with this document index and passes it to the LLM 607 (not shown in FIG. 15), which returns to the application interface 603 an answer to the query that is limited to the tenant boundary of Document1.

The "Load" layer of the ETDL processing engine 611 includes vectorizing each document and storing the vectorized documents in the vector database 810 of the OPAP data modeling tool 609, along with getting the vector index of the document which is stored in the hierarchical database 805 of the OPAP data modeling tool 609. In some embodiments, LlamaIndex and FIASS libraries are utilized for performing such functions using the pseudocode 1600, 1605 and 1610 shown in FIG. 16. The pseudocode 1600 creates a vector store (e.g., vector database 810), while the pseudocode 1605 loads the documents, vectorizes them and creates indexes. The pseudocode 1610 stores the created indexes in a hierarchical store (e.g., hierarchical database 805) under the appropriate domain with an associated differentiating entity and context entity.

Each of the natural language documents produced using the ETDL processing engine 611 may be updated as and when the source data is changed for that specific dataset. The ETDL processing engine 611 may be implemented as a pipeline (e.g., if a real-time or near real-time answer is required) or a batch (e.g., if it is permissible for an answer to a query to be "stale" or not near real-time). The vectorizing, indexing and storing operations consume computing resources (e.g., processor, memory, storage, and network resources), so the interval of data load and document update processes should be carefully selected and balanced based on available computing resources.

When a user (e.g., a user of Customer A) is logged in to an application (e.g., via the application interface 603 using client device 601), the following processing operations may be performed:

1. Get the user (e.g., customer) context, which is associated with a "differentiating entity" in the hierarchical database 805 of the OPAP data modeling tool 609.
2. When the user asks a question, the context of the question is derived to determine the "context entity" in the hierarchical database 805 of the OPAP data modeling tool 609.
3. Using the differentiating entity and the context entity, a document index is obtained from the hierarchical database 805 of the OPAP data modeling tool 609.
4. The obtained document index is used as part of a prompt to ask the LLM 607 the user query.
5. The LLM 607 converts the user query to a vector.
6. The LLM 607 gets only those documents that belong to the specific logged-in user (e.g., Customer A in this example) in vector format from the vector database 810 of the OPAP data modeling tool 609.
7. A semantic search is performed in the vector database 810 of the OPAP data modeling tool 609 with the query vector and the document vector.
8. The LLM 607 replies with an answer.

Figure 17:
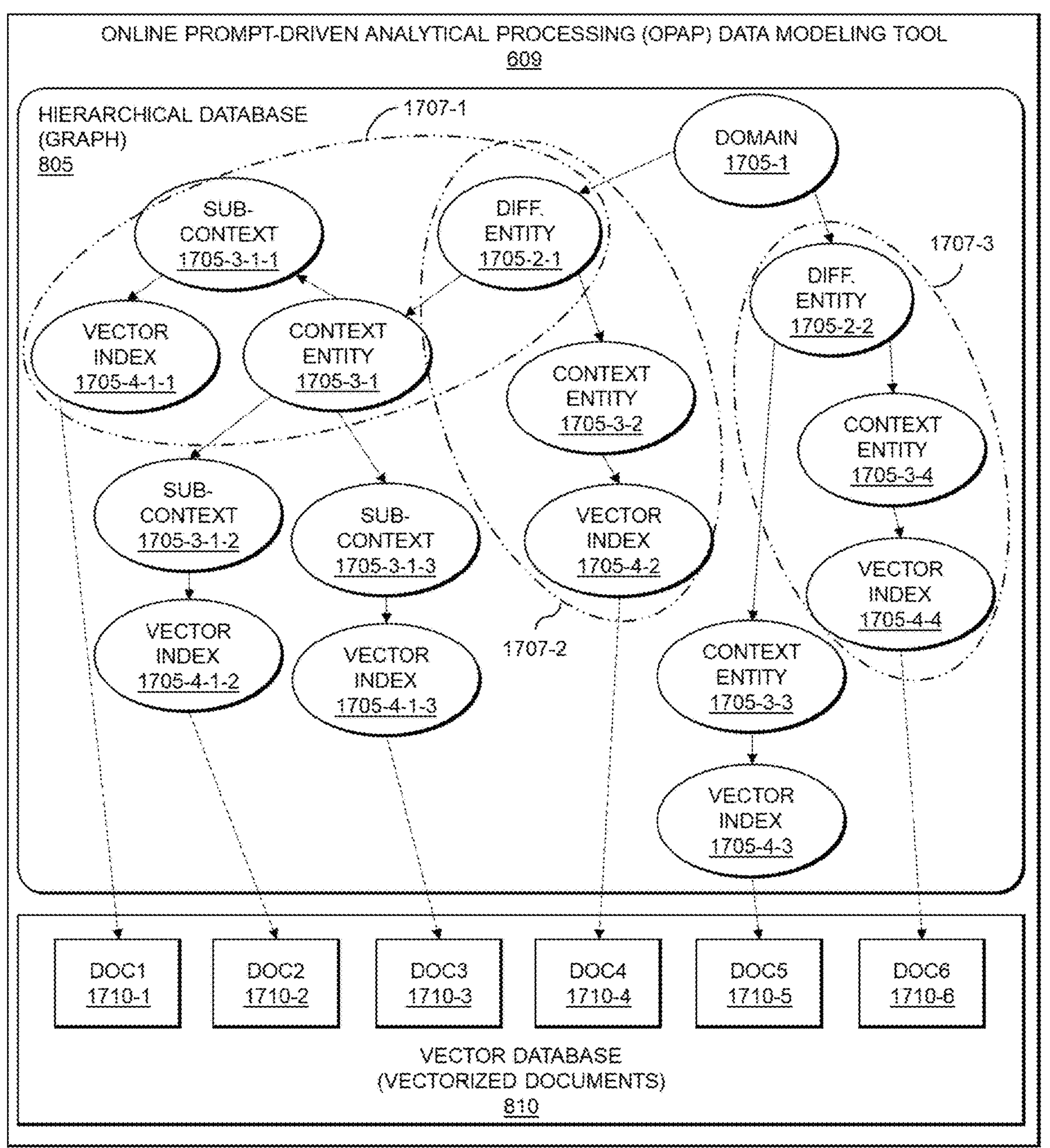
FIG. 17 shows an example of an online prompt-driven analytical processing data modeling tool with tenant boundaries in a hierarchical database in an illustrative embodiment.

FIG. 17 shows an example implementation of the OPAP data modeling tool 609. The OPAP data modeling tool 609 provides an online processing model for addressing secured multi-dimensional natural language-based queries through the deconstruction of structured data to understandable unstructured natural language, which is modeled via hierarchical data mapping within tenant and context boundaries, coupled with vectorized data and indices. In the example of FIG. 17, the hierarchical database 805 of the OPAP data modeling tool 609 includes a domain 1705-1, differentiating entities 1705-2-1 and 1705-2-2 (collectively, differentiating entities 1705-2), and context entities 1705-3-1, 1705-3-2, 1705-3-3 and 1705-3-4 (collectively, context entities 1705-3). In this example, the context entity 1705-3-1 includes sub-context entities 1705-3-1-1, 1705-3-1-2 and 1705-3-1-3 associated with respective vector indices 1705-4-1-1, 1705-4-1-2 and 1705-4-1-3. The context entities 1705-3-2, 1705-3-3 and 1705-3-4 are associated with respective vector indices 1705-4-2, 1705-4-3 and 1705-4-4. The vector indices 1705-4-1-1, 1705-4-1-2, 1705-4-1-3, 1705-4-2, 1705-4-3 and 1705-4-4 (collectively, vector indices 1705-4) are associated with respective documents 1710-1, 1710-2, 1710-3, 1710-4, 1710-5 and 1710-6 (collectively, documents 1710) in the vector database 810 of the OPAP data modeling tool 609. The hierarchical database 805 also shows tenant boundaries 1707-1, 1707-2 and 1707-3 (collectively, tenant boundaries 1707).

The domain 1705-1 provides high-level data segregation, and may be a functional domain (e.g., online sales). The differentiating entities 1705-2 provide the highest level of data boundary under the domain 1705-1 (e.g., customer). The context entities 1705-3 define different contexts of data that users may ask about (e.g., orders, subscriptions, etc.). Within a given context entity, such as context entity 1705-3-1, sub-contexts may be created (e.g., for different types of orders, such as sub-context 1705-3-1-1 for online order, sub-context 1705-3-1-2 for enterprise order and sub-context 1705-3-1-3 for consumer order). It should be appreciated that it should be ensured that a customer or user can ask in a level or not before subdividing the context entity, otherwise the sub-contexts will be needless overhead. The vector indices 1705-4 are associated with the vectorized documents 1710, and have a one-to-one mapping with the leaf level of the context entities 1705-3 (including any sub-contexts). The vectorized documents 1710 are documents for a specific context entity for a specific differentiating entity, and are stored in the vector database 810 of the OPAP data modeling tool 609.

The hierarchical database 805 of the OPAP data modeling tool 609 may utilize various schema hierarchy models for keeping the relationships between domains, differentiating entities and context entities, including a tree schema hierarchy, a tree star schema (e.g., for creating different contextual dimensions under a specific context entity), a tree snowflake schema (e.g., for referencing a document index, as one context/sub-context can have multiple documents and multiple document indices according to the use case), a one-to-one mapping schema for document index to document mapping, and tenant boundaries where a specific document index or group of document indices allow for a differentiating entity to access a specific context or sub-context.

In various organizations, a significant amount of data may be in the form of structured data, which is useful for various tasks. Structured data, however, is not optimal for usage with LLMs and other generative AI models. To use structured data with generative AI models, one approach is to load unstructured data as stories and video with embeddings to give LLM augmentation. Other approaches include using the LLM or an intent derivation classification engine to derive an intent of a user query, or calling APIs to get structured data queries or executing specific SQL queries. Structured data may also be handled utilizing OLTP and OLAP data models. The technical solutions described herein provide novel OPAP data modeling tools, which provide a data processing model for unstructured data with entity mapping. Some embodiments utilize an ETDL process as a way of converting structured data to unstructured data suitable for vectorizing for use with an LLM or other generative AI model, and also further tuning based on the LLM or other generative AI model that is being used. The technical solutions are also able to provide tenant boundaries in the vectorized data using differentiating entities and context entities, to avoid data breaches between differentiating entities for data segregation between customers, users or other entities.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for machine learning-based processing of queries using structured data converted to natural language documents will now be described in greater detail with reference to FIGS. 18 and 19. Although described in the context of system 100, these platforms may also be used to implement at least portions of other information processing systems in other embodiments.

Figure 18:
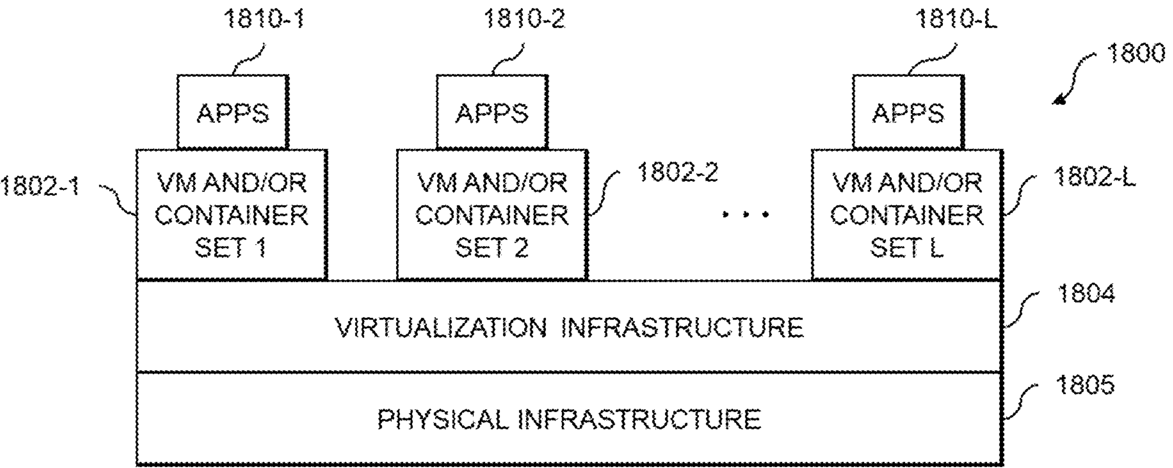
FIGS. 18 and 19 show examples of processing platforms that may be utilized to implement at least a portion of an information processing system in illustrative embodiments.
Figure 19:
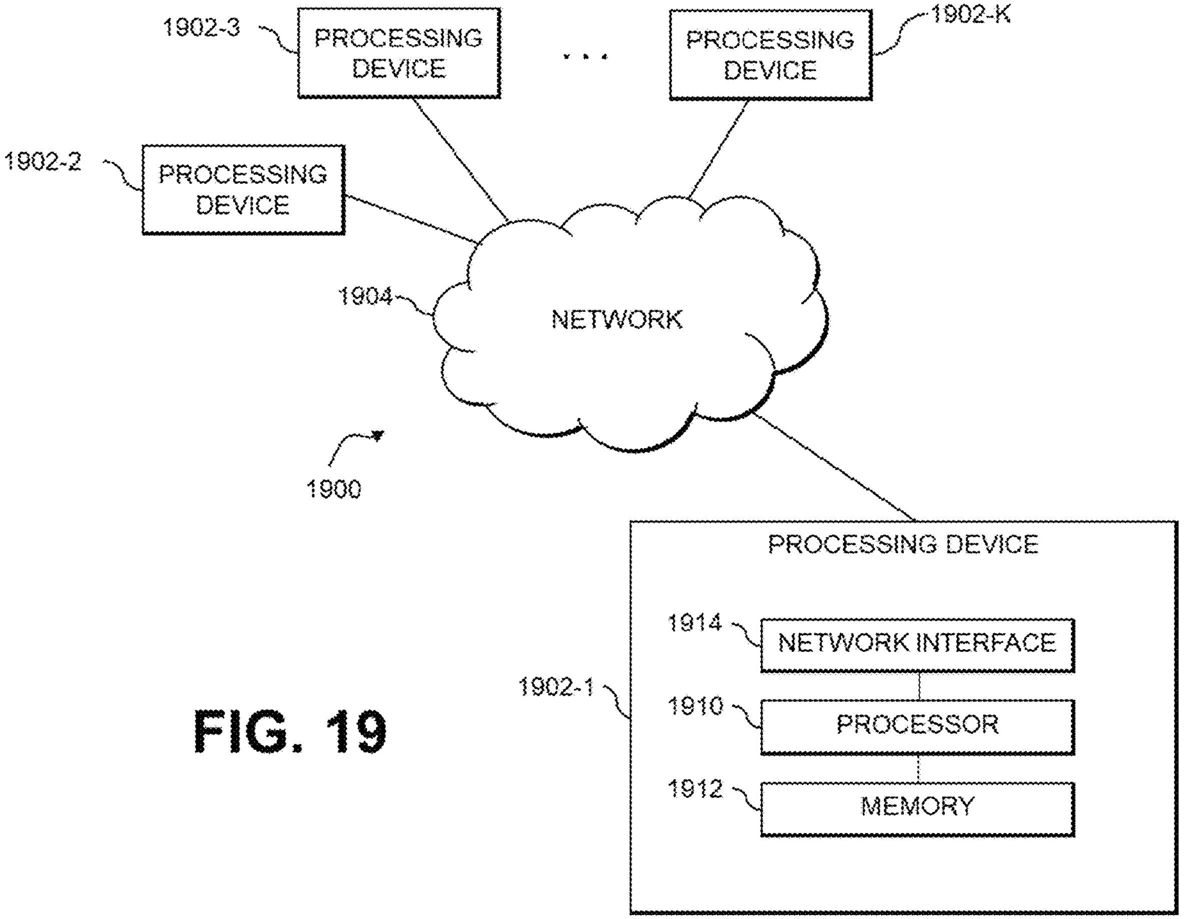

FIG. 18 shows an example processing platform comprising cloud infrastructure 1800. The cloud infrastructure 1800 comprises a combination of physical and virtual processing resources that may be utilized to implement at least a portion of the information processing system 100 in FIG. 1. The cloud infrastructure 1800 comprises multiple virtual machines (VMs) and/or container sets 1802-1, 1802-2, . . . 1802-L implemented using virtualization infrastructure 1804. The virtualization infrastructure 1804 runs on physical infrastructure 1805, and illustratively comprises one or more hypervisors and/or operating system level virtualization infrastructure. The operating system level virtualization infrastructure illustratively comprises kernel control groups of a Linux operating system or other type of operating system.

The cloud infrastructure 1800 further comprises sets of applications 1810-1, 1810-2, . . . 1810-L running on respective ones of the VMs/container sets 1802-1, 1802-2, . . . 1802-L under the control of the virtualization infrastructure 1804. The VMs/container sets 1802 may comprise respective VMs, respective sets of one or more containers, or respective sets of one or more containers running in VMs.

In some implementations of the FIG. 18 embodiment, the VMs/container sets 1802 comprise respective VMs implemented using virtualization infrastructure 1804 that comprises at least one hypervisor. A hypervisor platform may be used to implement a hypervisor within the virtualization infrastructure 1804, where the hypervisor platform has an associated virtual infrastructure management system. The underlying physical machines may comprise one or more distributed processing platforms that include one or more storage systems.

In other implementations of the FIG. 18 embodiment, the VMs/container sets 1802 comprise respective containers implemented using virtualization infrastructure 1804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1800 shown in FIG. 18 may represent at least a portion of one processing platform. Another example of such a processing platform is processing platform 1900 shown in FIG. 19.

The processing platform 1900 in this embodiment comprises a portion of system 100 and includes a plurality of processing devices, denoted 1902-1, 1902-2, 1902-3, . . . 1902-K, which communicate with one another over a network 1904.

The network 1904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1902-1 in the processing platform 1900 comprises a processor 1910 coupled to a memory 1912.

The processor 1910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU), a neural processing unit (NPU), a data processing unit (DPU, a System-on-Chip (SOC) or other type of processing circuitry, as well as portions or combinations of such circuitry elements.

The memory 1912 may comprise random access memory (RAM), read-only memory (ROM), flash memory or other types of memory, in any combination. The memory 1912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1902-1 is network interface circuitry 1914, which is used to interface the processing device with the network 1904 and other system components, and may comprise conventional transceivers.

The other processing devices 1902 of the processing platform 1900 are assumed to be configured in a manner similar to that shown for processing device 1902-1 in the figure.

Again, the particular processing platform 1900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for machine learning-based processing of queries using structured data converted to natural language documents as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device being configured:

to obtain, at an application interface, a query, the query being directed to structured data in one or more structured data sources;

to generate one or more natural language linker configuration templates for the one or more structured data sources, the one or more natural language linker configuration templates specifying (i) one or more differentiating entities in the one or more structured data sources and (ii) links between the one or more differentiating entities in the one or more structured data sources and one or more columns in the one or more structured data sources to create natural language text;

to convert at least a portion of the structured data extracted from the one or more structured data sources into one or more natural language documents, wherein converting said at least a portion of the structured data extracted from the one or more structured data sources into the one or more natural language documents comprises applying the generated one or more natural language linker configuration templates to generate, for each of at least a subset of the one or more differentiating entities in the one or more structured data sources, one or more separate natural language documents for each of one or more context entities associated with the subset of the one or more differentiating entities;

to associate the one or more natural language documents with vector indexes in a hierarchical database, the hierarchical database defining a hierarchy of the one or more differentiating entities and the one or more context entities;

to store the one or more natural language documents in a vectorized format in a vector database, the one or more natural language documents being associated with the vector indexes in the hierarchical database, the vector indexes being associated with respective ones of the one or more context entities in the hierarchical database;

to determine a tenant boundary of the query, the tenant boundary specifying at least one of the one or more context entities associated with at least one of the one or more differentiating entities in the hierarchical database;

to generate a prompt for processing utilizing at least one machine learning model, the prompt identifying the query and a subset of the one or more natural language documents selected based at least in part on the determined tenant boundary, wherein generating the prompt comprises retrieving the vectorized formats of the identified subset of the one or more natural language documents from the vector database and utilizing the vectorized formats of the identified subset of the one or more natural language documents in generating the prompt;

to process the prompt utilizing the at least one machine learning model to generate an answer for the query; and to provide, via the application interface, the generated answer to the query.

2. The apparatus of claim 1 wherein the one or more structured data sources comprise at least one of an online transaction processing database and an online analytical processing database.

3. The apparatus of claim 1 wherein a given one of the one or more natural language linker configuration templates specifies an ordering for creating natural language text from content in two or more columns of the structured data.

4. The apparatus of claim 3 wherein the given natural language linker configuration template further specifies, for at least one of the two or more columns of the structured data, at least one of a suffix and a prefix to be appended to the content of the at least one of the two or more columns of the structured data.

5. The apparatus of claim 3 wherein the given natural language linker configuration template further specifies whether respective ones of the two or more columns of the structured data represent at least one of the one or more differentiating entities.

6. The apparatus of claim 3 wherein converting the portion of the structured data from the one or more structured data sources into the one or more natural language documents further comprises tuning an output of the given natural language linker configuration template utilizing a large language model.

7. The apparatus of claim 3 wherein converting the portion of the structured data from the one or more structured data sources into the one or more natural language documents further comprises testing an output of the given natural language linker configuration template utilizing one or more test queries.

8. The apparatus of claim 1 wherein determining the tenant boundary of the query comprises determining said at least one of the one or more differentiating entities in the hierarchical database based at least in part on identifying a source that submitted the query to the application interface.

9. The apparatus of claim 1 wherein determining the tenant boundary of the query comprises determining said at least one of the one or more differentiating entities in the hierarchical database based at least in part on identifying a user that is logged in to the application interface.

10. The apparatus of claim 1 wherein determining the tenant boundary of the query comprises determining said at least one of the one or more context entities in the hierarchical database based at least in part on applying natural language processing to text of the query.

11. The apparatus of claim 1 wherein the at least one machine learning model comprises a generative artificial intelligence model.

12. The apparatus of claim 1 wherein the at least one machine learning model comprises a large language model.

13. The apparatus of claim 1 wherein converting said at least a portion of the structured data extracted from the one or more structured data sources into the one or more natural language documents utilizes an extract, transform to document, load (ETDL) process.

14. The apparatus of claim 13 wherein the ETDL process comprises:

extracting structured labeled data from the one or more structured data sources; and converting the structured labeled data into natural language text by mapping one or more labels of the structured label data utilizing the one or more context entities and the one or more differentiating entities in the hierarchical database.

15. A computer program product comprising a non-transitory processor-readable storage medium having stored therein program code of one or more software programs, wherein the program code when executed by at least one processing device causes the at least one processing device:

to obtain, at an application interface, a query, the query being directed to structured data in one or more structured data sources;

to generate one or more natural language linker configuration templates for the one or more structured data sources, the one or more natural language linker configuration templates specifying (i) one or more differentiating entities in the one or more structured data sources and (ii) links between the one or more differentiating entities in the one or more structured data sources and one or more columns in the one or more structured data sources to create natural language text;

to convert at least a portion of the structured data extracted from the one or more structured data sources into one or more natural language documents, wherein converting said at least a portion of the structured data extracted from the one or more structured data sources into the one or more natural language documents comprises applying the generated one or more natural language linker configuration templates to generate, for each of at least a subset of the one or more differentiating entities in the one or more structured data sources, one or more separate natural language documents for each of one or more context entities associated with the subset of the one or more differentiating entities;

to associate the one or more natural language documents with vector indexes in a hierarchical database, the hierarchical database defining a hierarchy of the one or more differentiating entities and the one or more context entities;

to store the one or more natural language documents in a vectorized format in a vector database, the one or more natural language documents being associated with the vector indexes in the hierarchical database, the vector indexes being associated with respective ones of the one or more context entities in the hierarchical database;

to determine a tenant boundary of the query, the tenant boundary specifying at least one of the one or more context entities associated with at least one of the one or more differentiating entities in the hierarchical database;

to generate a prompt for processing utilizing at least one machine learning model, the prompt identifying the query and a subset of the one or more natural language documents selected based at least in part on the determined tenant boundary, wherein generating the prompt comprises retrieving the vectorized formats of the identified subset of the one or more natural language documents from the vector database and utilizing the vectorized formats of the identified subset of the one or more natural language documents in generating the prompt;

to process the prompt utilizing the at least one machine learning model to generate an answer for the query; and to provide, via the application interface, the generated answer to the query.

16. The computer program product of claim 15 wherein a given one of the one or more natural language linker configuration templates specifies an ordering for creating natural language text from content in two or more columns of the structured data.

17. The computer program product of claim 15 wherein determining the tenant boundary of the query comprises determining said at least one of the one or more differentiating entities in the hierarchical database based at least in part on identifying a user that is logged in to the application interface.

18. A method comprising:

obtaining, at an application interface, a query, the query being directed to structured data in one or more structured data sources;

generating one or more natural language linker configuration templates for the one or more structured data sources, the one or more natural language linker configuration templates specifying (i) one or more differentiating entities in the one or more structured data sources and (ii) links between the one or more differentiating entities in the one or more structured data sources and one or more columns in the one or more structured data sources to create natural language text;

converting at least a portion of the structured data extracted from the one or more structured data sources into one or more natural language documents, wherein converting said at least a portion of the structured data extracted from the one or more structured data sources into the one or more natural language documents comprises applying the generated one or more natural language linker configuration templates to generate, for each of at least a subset of the one or more differentiating entities in the one or more structured data sources, one or more separate natural language documents for each of one or more context entities associated with the subset of the one or more differentiating entities;

associating the one or more natural language documents with vector indexes in a hierarchical database, the hierarchical database defining a hierarchy of the one or more differentiating entities and the one or more context entities;

storing the one or more natural language documents in a vectorized format in a vector database, the one or more natural language documents being associated with the vector indexes in the hierarchical database, the vector indexes being associated with respective ones of the one or more context entities in the hierarchical database;

determining a tenant boundary of the query, the tenant boundary specifying at least one of the one or more context entities associated with at least one of the one or more differentiating entities in the hierarchical database;

generating a prompt for processing utilizing at least one machine learning model, the prompt identifying the query and a subset of the one or more natural language documents selected based at least in part on the determined tenant boundary, wherein generating the prompt comprises retrieving the vectorized formats of the identified subset of the one or more natural language documents from the vector database and utilizing the vectorized formats of the identified subset of the one or more natural language documents in generating the prompt;

processing the prompt utilizing the at least one machine learning model to generate an answer for the query; and providing, via the application interface, the generated answer to the query;

wherein the method is performed by at least one processing device comprising a processor coupled to a memory.

19. The method of claim 18 wherein a given one of the one or more natural language linker configuration templates specifies an ordering for creating natural language text from content in two or more columns of the structured data.

20. The method of claim 18 wherein determining the tenant boundary of the query comprises determining said at least one of the one or more differentiating entities in the hierarchical database based at least in part on identifying a user that is logged in to the application interface.

* * * * *